(12) United States Patent
Khan

(10) Patent No.: US 11,253,980 B2
(45) Date of Patent: Feb. 22, 2022

(54) MULTI-FUNCTION SKATEBOARD TOOL

(71) Applicant: Alim Ahamad Khan, San Diego, CA (US)

(72) Inventor: Alim Ahamad Khan, San Diego, CA (US)

( * ) Notice: Subject to any disclaimer, the term of this patent is extended or adjusted under 35 U.S.C. 154(b) by 187 days.

(21) Appl. No.: 16/635,975

(22) PCT Filed: Jul. 24, 2018

(86) PCT No.: PCT/US2018/043531
§ 371 (c)(1),
(2) Date: Jan. 31, 2020

(87) PCT Pub. No.: WO2019/027740
PCT Pub. Date: Feb. 7, 2019

(65) Prior Publication Data
US 2020/0238481 A1 Jul. 30, 2020

Related U.S. Application Data

(60) Provisional application No. 62/538,886, filed on Jul. 31, 2017.

(51) Int. Cl.
| *B25B 13/46* | (2006.01) |
| *B25B 13/06* | (2006.01) |
| *B23G 5/20* | (2006.01) |
| *B25B 13/48* | (2006.01) |

(Continued)

(52) U.S. Cl.
CPC .............. *B25B 13/46* (2013.01); *B25B 13/06* (2013.01); *B23G 5/20* (2013.01); *B23G 2200/143* (2013.01); *B25B 13/48* (2013.01); *B25B 23/16* (2013.01); *B25G 3/00* (2013.01)

(58) Field of Classification Search
CPC ......... B25B 13/46; B25B 13/06; B25B 13/48; B25G 3/00; B25G 3/02; B25G 3/04; B25G 3/12; B25G 3/34; B25G 1/08; B25G 1/085; B23G 5/20; B25F 1/00; B25F 1/02; A63C 17/0006
See application file for complete search history.

(56) References Cited

U.S. PATENT DOCUMENTS 7,305,907 B2 * 12/2007 Burwell .................. B25B 13/56
81/177.2
10,029,360 B2 * 7/2018 Sun ....................... B25B 13/463
(Continued)

*Primary Examiner* — David B. Thomas
(74) *Attorney, Agent, or Firm* — Kilpatrick Townsend & Stockton LLP

(57) ABSTRACT

The multi-function tool described herein includes a case, a drive ratchet installed in the case, a threading die held within the case, a file attached to the case such that a working surface of the file is exposed, a wrench tool removably secured to the case by a wrench retaining feature formed in the case, socket tools removably secured to the case by socket retaining features formed in the case, and a bar extension tool removably secured to the case by a bar extension retaining feature formed in the case. The ratchet has a fitting exposed at the top of the case, and a toggle switch exposed at the bottom of the case. The bar extension tool is compatible with the socket tools, the fitting of the ratchet is compatible with the socket tools, and the fitting of the ratchet is compatible with the bar extension tool.

20 Claims, 20 Drawing Sheets

(51) Int. Cl.
   *B25B 23/16* (2006.01)
   *B25G 3/00* (2006.01)

(56) References Cited

U.S. PATENT DOCUMENTS 10,040,185 B2 * 8/2018 Davis ........................ B23G 5/20
10,207,398 B2 * 2/2019 Ma ...................... B25B 27/0035

* cited by examiner

MULTI-FUNCTION SKATEBOARD TOOL

CROSS-REFERENCE TO RELATED APPLICATION

This application claims the benefit of U.S. provisional patent application No. 62/538,886, filed Jul. 31, 2017.

TECHNICAL FIELD

Embodiments of the subject matter described herein relate generally to multi-function tools and accessories of the type used for skateboards.

BACKGROUND

Skateboarding is a wonderful sport that has become more popular with America's youth than little league baseball, Pop Warner football, and other traditional sporting activities. A skateboard includes the following fundamental components: a deck; four wheels, and two trucks that attach the wheels to the deck and which serve as turning mechanisms for the skateboard. Each truck is attached to the deck using nuts and bolts, and each wheel is attached to the threaded end of a truck axle using a nut. The turning responsiveness of each truck is adjustable by tightening or loosening a kingpin nut. Accordingly, assembly, maintenance, and adjustment of a skateboard requires a variety of tools (e.g., screwdrivers, wrenches, sockets, or the like).

The prior art is replete with different types of skateboard tools. Many skateboard tools are "all-in-one" designs that include features that are specifically sized and configured for standard sized truck mounting hardware, axle nuts, and kingpin nuts. Although conventional skateboard tool designs may be convenient and/or compact, those benefits can be outweighed by various shortcomings and deficiencies. For example, some low-cost skateboard tools break easy or have parts that wear out too soon. As another example, traditional skateboard tools may be cumbersome and difficult to use, which can be bothersome when quick adjustment or assembly is required.

Accordingly, there is a need for an improved skateboard tool that is robust, reliable, easy to use, and well-functioning. Furthermore, other desirable features and characteristics of the present invention will become apparent from the subsequent detailed description and the appended claims, taken in conjunction with the accompanying drawings and the foregoing technical field and background.

BRIEF SUMMARY

A multi-function tool is disclosed. An embodiment of the tool includes: a case having a top side, a bottom side, a front side, a back side, a right side, and a left side; a drive ratchet installed in a ratchet cavity formed in the case, the drive ratchet comprising a fitting exposed at the top side of the case and further comprising a toggle switch exposed at the bottom side of the case, wherein manipulation of the toggle switch changes direction of the drive ratchet, and wherein the fitting is configured to receive sockets and a bar extension for the sockets; a threading die held within a die cavity formed in the case, the threading die comprising cutting threads to form or repair external threads; a file attached to the case such that at least a portion of a working surface of the file is exposed; a wrench retaining feature integrally formed in the case, the wrench retaining feature configured to secure a wrench to the case in a removable manner; a plurality of socket retaining features integrally formed in the case, each of the socket retaining features configured to secure a respective socket to the case in a removable manner; and a bar extension retaining feature integrally formed in the case, the bar extension retaining feature configured to secure a bar extension to the case in a removable manner.

In an embodiment, the file is attached at or near an edge of the case. In an embodiment, the tool further comprises a wrench tool removably coupled to the case via the wrench retaining feature, a plurality of different sized socket tools removably coupled to the case via the plurality of socket retaining features, and a bar extension tool removably coupled to the case via the bar extension retaining feature, wherein the drive ratchet and the fitting are compatible with the socket tools and the bar extension tool. In an embodiment, the tool further comprises a razor blade slot integrally formed in the case, the razor blade slot configured to receive a razor blade. In an embodiment, the tool further comprises a spring clip attached to the case, wherein the spring clip cooperates with the razor blade slot to secure the razor blade to the case in a removable manner. In an embodiment, the tool further comprises a mount arm removably attached to the case, the mount arm configured to hold a mobile device in place on the case in an orientation intended to support a camera function of the mobile device. In an embodiment, the mount arm comprises a slot formed therein to accommodate adjustment of the mount arm relative to the case, the tool further comprises a thumb screw and a threaded insert located on the case, the threaded insert configured to receive the thumb screw, and the slot receives the thumb screw to facilitate adjustment of a clamping position of the mount arm, such that tightening of the thumb screw secures the mobile device to the case. In an embodiment, the tool further comprises a tripod having a threaded tip, and a threaded insert located on the case, the threaded insert configured to receive the threaded tip of the tripod. In an embodiment, the drive ratchet is installed in a longitudinally offset location of the case such that the case serves as a moment arm when the drive ratchet is used. In an embodiment, the tool further comprises a finger slot formed in the case at an end of the bar extension retaining feature, the finger slot forming a gap underlying an end of a bar extension tool seated in the bar extension retaining feature. In an embodiment, the tool further comprises a finger slot formed in the case at an end of the wrench retaining feature, the finger slot forming a gap underlying an end of a wrench tool seated in the wrench retaining feature. In an embodiment, the drive ratchet and fitting are oriented to hold a bar extension tool substantially perpendicular to the case.

An embodiment of a multi-function tool includes: a case having a top side, a bottom side, a front side, a back side, a right side, and a left side; a drive ratchet installed in a ratchet cavity formed in the case, the drive ratchet comprising a fitting exposed at the top side of the case and further comprising a toggle switch exposed at the bottom side of the case, wherein manipulation of the toggle switch changes direction of the drive ratchet; a threading die held within a die cavity formed in the case, the threading die comprising cutting threads to form or repair external threads; a file attached to the case such that at least a portion of a working surface of the file is exposed; a wrench retaining feature integrally formed in the case; a wrench tool configured to be removably held by the wrench retaining feature; a plurality of socket retaining features integrally formed in the case; a plurality of socket tools configured to be removably held by the plurality of socket retaining features; a bar extension retaining feature integrally formed in the case; and a bar extension tool configured to be removably held by the bar extension retaining feature, wherein the drive ratchet and the fitting are compatible with the socket tools and the bar extension tool.

In an embodiment, the tool further comprises a razor blade slot integrally formed in the case, the razor blade slot configured to receive a razor blade. In an embodiment, the tool further comprises a spring clip attached to the case, wherein the spring clip cooperates with the razor blade slot to secure the razor blade to the case in a removable manner. In an embodiment, the tool further comprises a mount arm removably attached to the case, the mount arm configured to hold a mobile device in place on the case in an orientation intended to support a camera function of the mobile device. In an embodiment, the tool further comprises a tripod having a threaded tip, and a threaded insert located on the bottom side of the case, the threaded insert configured to receive the threaded tip of the tripod. In an embodiment, the tool further comprises a finger slot formed in the case at an end of the bar extension retaining feature, the finger slot forming a gap underlying an end of the bar extension tool when seated in the bar extension retaining feature, and underlying an end of the wrench tool when seated in the wrench retaining feature. In an embodiment, the drive ratchet and fitting are oriented to hold the bar extension tool substantially perpendicular to the case.

An embodiment of a multi-function tool includes: a case having a top side, a bottom side, a front side, a back side, a right side, and a left side; a drive ratchet installed in a ratchet cavity formed in the case, the drive ratchet comprising a fitting exposed at the top side of the case and further comprising a toggle switch exposed at the bottom side of the case, wherein manipulation of the toggle switch changes direction of the drive ratchet; a threading die held within a die cavity formed in the case, the threading die comprising cutting threads to form or repair external threads; a file attached to the case such that at least a portion of a working surface of the file is exposed; a wrench tool removably secured to the case by a wrench retaining feature integrally formed in the case; a plurality of socket tools removably secured to the case by a plurality of socket retaining features integrally formed in the case; and a bar extension tool removably secured to the case by a bar extension retaining feature integrally formed in the case, wherein the bar extension tool is compatible with the socket tools, the fitting of the drive ratchet is compatible with the socket tools, and the fitting of the drive ratchet is compatible with the bar extension tool.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
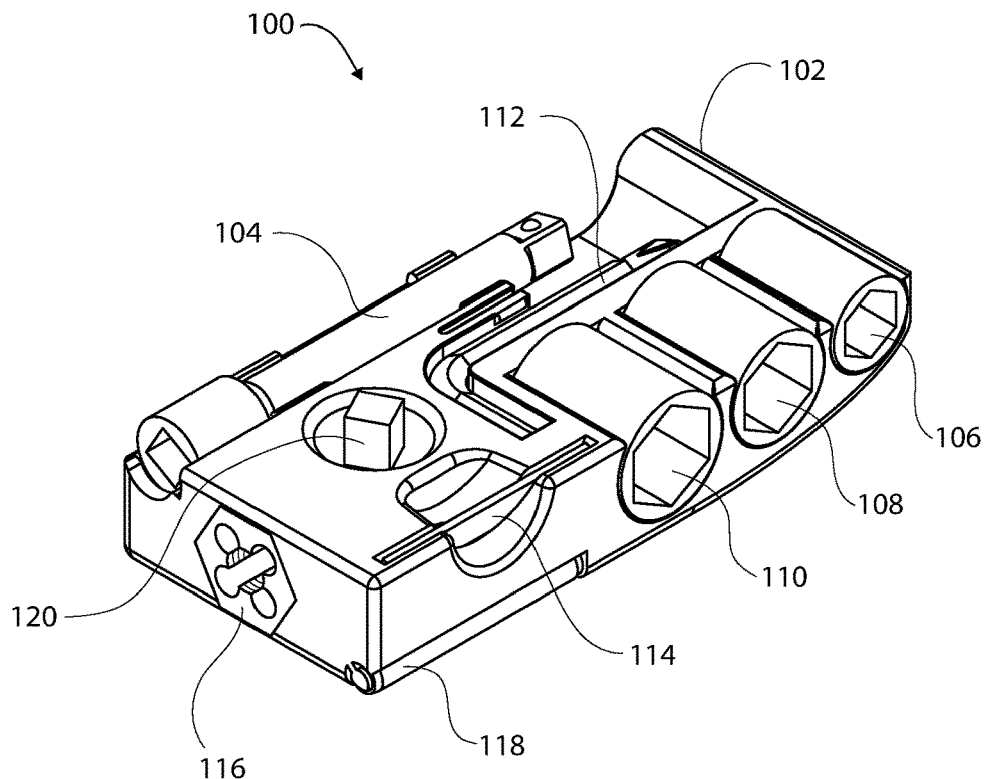
FIGS. 1-4 are different top perspective views of an exemplary, embodiment of a skateboard tool.
Figure 2:
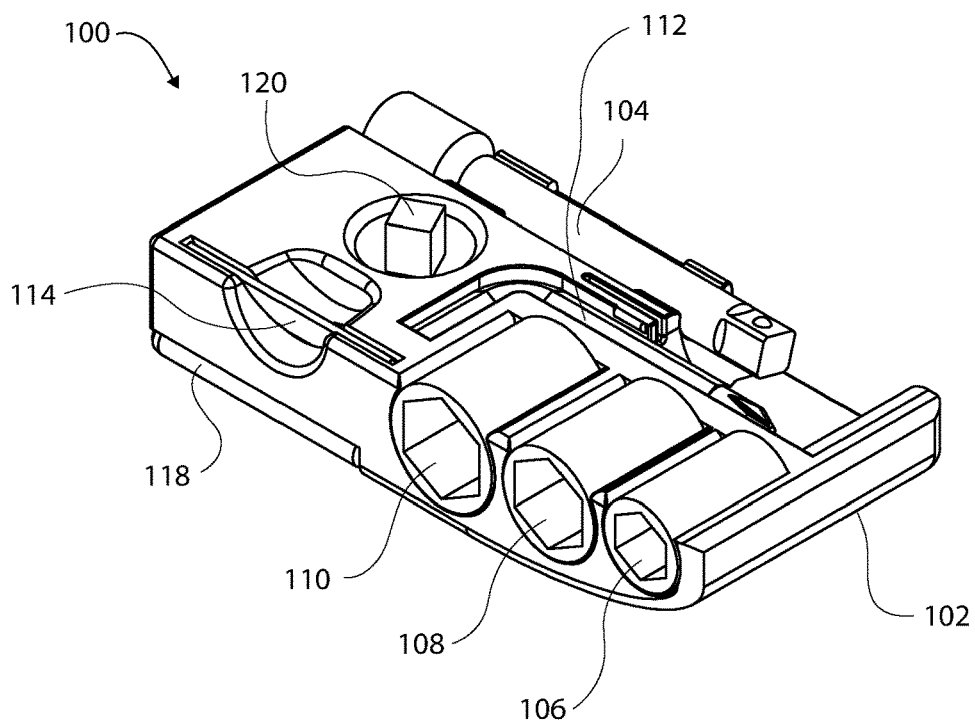
Figure 3:
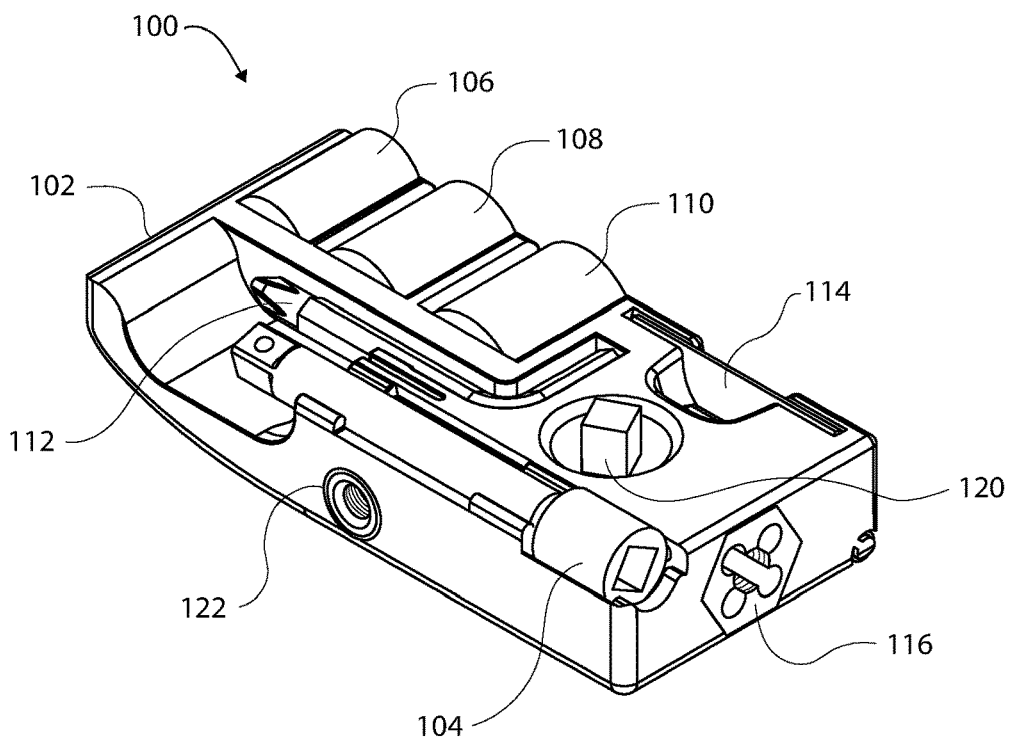

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary of or the following detailed description.

The following description may refer to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically.

In addition, certain terminology may also be used in the following description for the purpose of reference only, and thus are not intended to be limiting. For example, terms such as "upper, "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import Similarly, the terms "first", "second" and other such numerical terms referring to structures do not imply a sequence or order unless clearly indicated by the context.

This multi-function skateboard tool is a versatile skateboard tool that consolidates multiple tools into one compact gadget to help skateboarders assemble, maintain, adjust, and repair skateboards. This multi-function skateboard tool acts as an all-in-one skateboard tool as it contains each and every tool needed to be compatible with the various components of a skateboard (e.g., different sized nuts and bolts on a skateboard). The multiple tools this multi-function skateboard tool contains are secured in a casing by their retaining features and are intended to be removed for usage while some tools are intended to remain fixed into the casing. The casing also acts as a handle/lever to be used with the tools when removed and with the tools fixed in the casing. This multi-function skateboard tool offers the benefit of eliminating the need of having to carry multiple tools to assemble, maintain, adjusts, and repair skateboards. In addition, this multi-function skateboard tool is designed to offer superior functionality over existing skateboard tools. Skateboards contain various sized nuts that are threaded onto bolts holding various skateboard components together and require the nuts to be tightened/loosened with properly sized socket tools for assembly, maintenance, adjustments, and repairs. This multi-function skateboard tool contains socket tools with no surrounding material (e.g., plastic moldings) around the outer diameter of the socket tools when in use to prevent clearance issues, providing the socket tools complete unobstructed access to the nuts, and allowing the socket tools to be fully seated onto the nuts. This provides the necessary torque required when tightening/loosening the nuts and prevents the socket tools from slipping off the nuts which is a problem other existing skateboard tools have issues with due to the surrounding material (e.g., plastic molding) around the outer diameter of their socket tools. Another fundamental benefit this multi-function skateboard tool offers is the drive ratchet feature compatible to work with all the various sized socket tools. The drive ratchet feature allows a user of this tool to continuously turn/tighten/loosen/adjust the various sized nuts on a skateboard without having to remove and reposition the sockets onto the nuts after each turn while existing skateboard tools require users to do. The removable tools included in this multi-function skateboard tool are properly secured with the casing retaining features to prevent the removable tools from falling out and getting lost when stored/not in use. This multi-function skateboard tool is the first skateboard tool to incorporate attributes to be used with a filming device (e.g., cell phone) for recording. This multi-function skateboard tool acts as a phone mount to be used with is related accessories (e.g., phone mount arm, tripod stand) to secure a filming device (e.g., cell phone) to be propped up and aimed at a target for capturing videos/pictures.

Figure 9:
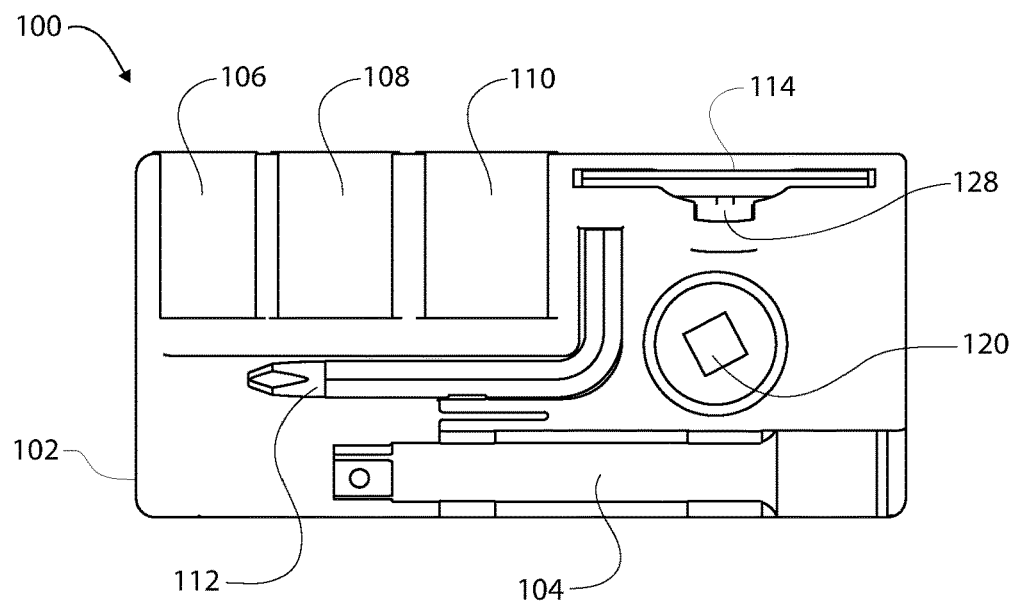
FIG. 9 is a top view of the skateboard tool.
Figure 10:
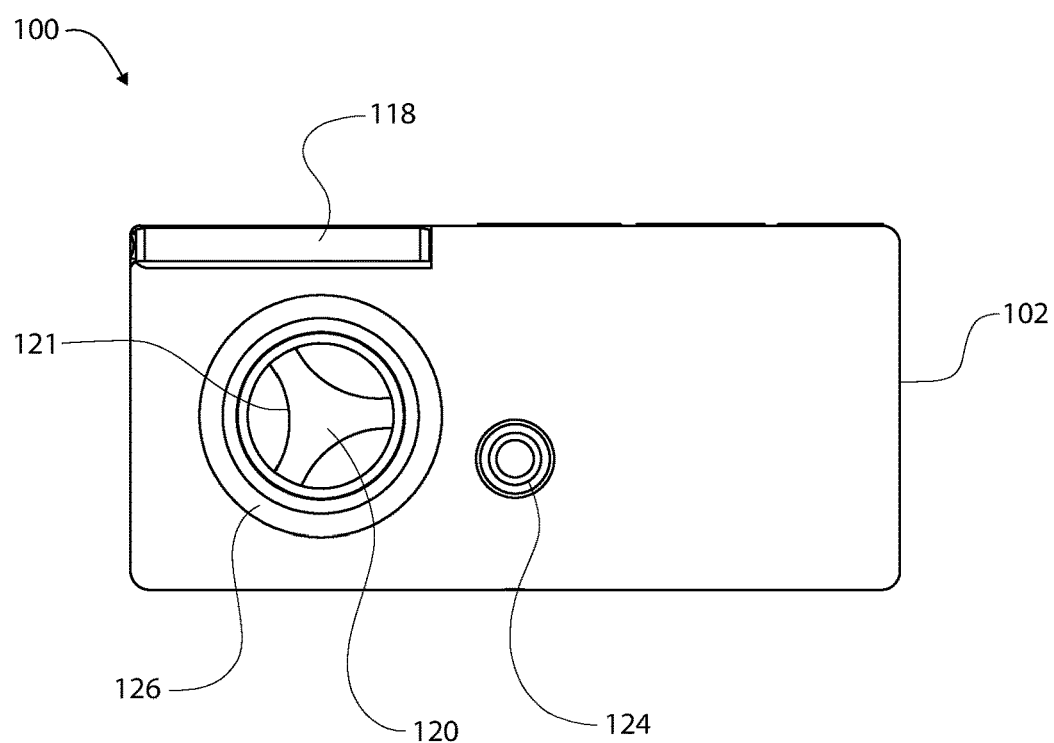
FIG. 10 is a bottom view of the skateboard tool.
Figure 11:
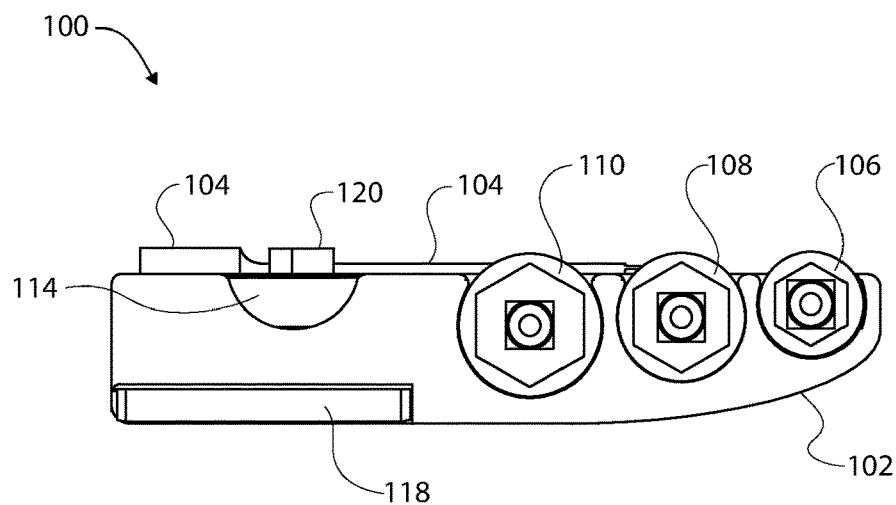
FIG. 11 is a front view of the skateboard tool.
Figure 12:
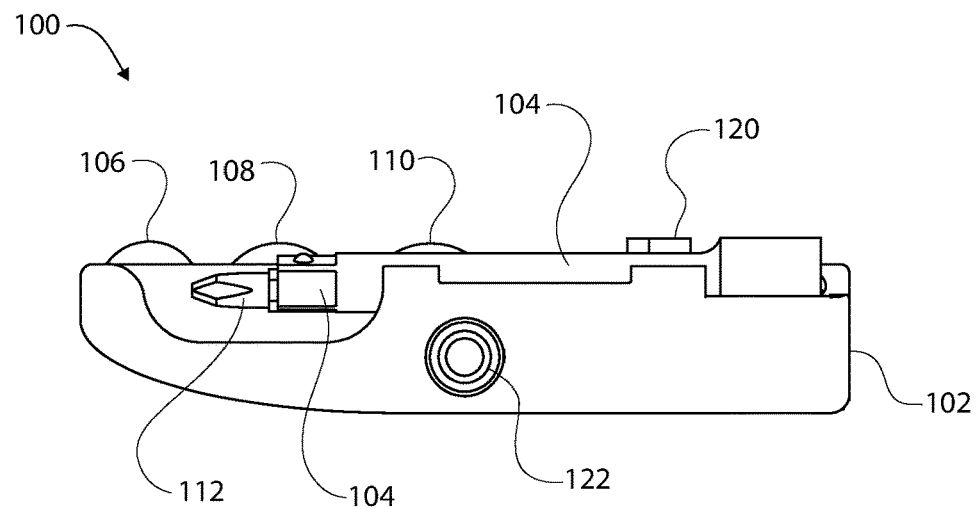
FIG. 12 is a back view of the skateboard tool.
Figure 13:
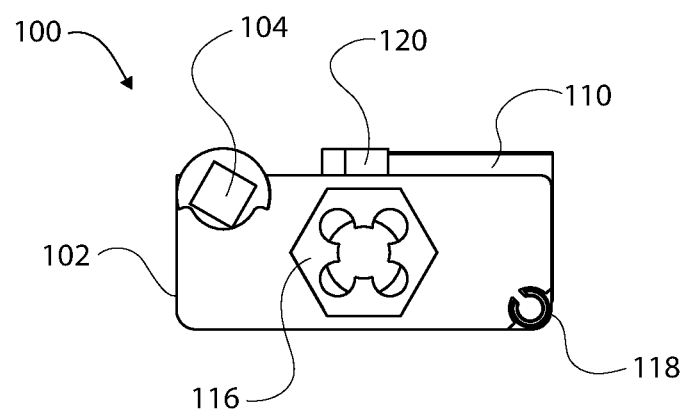
FIG. 13 is a left side view of the skateboard tool.
Figure 14:
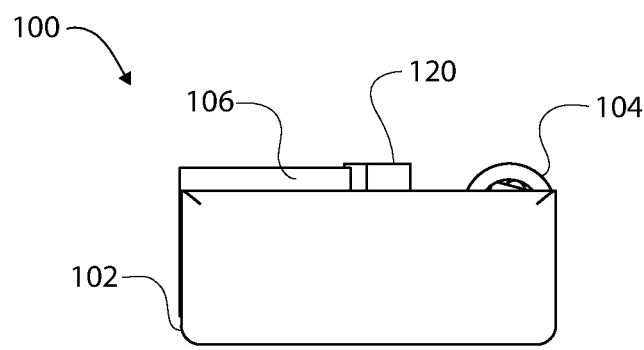
FIG. 14 is a right side view of the skateboard tool.

FIGS. 1-14 show various views of exemplary embodiment of a skateboard tool 100 in its assembled form. FIGS. 1-4 are different top perspective views of the tool 100, FIGS. 5-8 are different bottom perspective views of the tool 100, FIG. 9 is a top view of the tool 100, FIG. 10 is a bottom view of the tool 100, FIG. 11 is a front view of the tool 100, FIG. 12 is a back view of the tool 100, FIG. 13 is a left side view of the tool 100, and FIG. 14 is a right side view of the tool.

The illustrated embodiment of the skateboard tool 100 generally includes, without limitation: a case 102; a bar extension tool 104; three socket tools 106, 108, 110 of various sizes; a wrench tool 112; a razor blade 114; a threading die 116; a file 118; a drive ratchet 120; threaded inserts 122, 124; a ratchet cap 126; and a spring clip 128. The case 102 is shaped, formed, and otherwise configured to accommodate and removably hold a number of tools and components that are useful to skateboarders. The case 102 can be formed from injection molded plastic, or any similar material. In preferred implementations the case 102 can be a single-piece component or it can be formed from multiple components that are bonded or glued or secured together.

As shown in FIGS. 1-14, the case 102 includes different structural features cavities, slots, grooves, holes, tabs, and the like to receive and removably hold the individual tools such that any given tool can be removed for use and returned to the case 102 for storage, handling, and travel. In this regard, the bar extension tool 104 can be removed from its stored position so that its female end can be installed onto the fitting of the drive ratchet 120, which is a square fitting for this particular embodiment (see FIG. 19). The socket tools 106, 108, 110 are compatible with the male end of the bar extension tool 104. Any of the socket tools 106, 108, 110 can be removed from their stored location on the case 102, and installed onto the male end of the bar extension tool 104. The case 102 can then be utilized as a handle to actuate the drive ratchet 120 for purposes of tightening/loosening nuts that are commonly used on a skateboard. More specifically, the socket tool 106 is sized ⅜ inch for adjustment of truck mounting hardware, the socket tool 108 is sized ½ inch for adjustment of axle nuts, and the socket tool 110 is sized 9/16 inch for adjustment of the truck kingpin nut.

The case 102 also includes a feature to secure the wrench tool 112 when not in use. The wrench tool 112 can be an L-shaped wrench having one end configured as an allen wrench, and having the other end configured as a phillips head screwdriver. Alternatively or additionally, the wrench tool 112 can include any suitable end configuration (flathead screwdriver, star-shaped pattern, etc.). Both ends are compatible with commonly used truck mounting bolts/screws.

The case 102 also includes a slot to secure the razor blade 114 when not in use. The razor blade 114 is maintained in the case via the spring clip 128, which adds tension on one side of the razor blade 114, pressing it against the interior of the slot. The razor blade 114 is useful for installing sheets of adhesive grip tape on a skateboard deck. Likewise, the file 118, which is attached to a side corner of the case 102, is useful when installing sheets of grip tape on a skateboard deck. The tool 100 can be held while the file 118 is scraped against grip tape at the edge of the skateboard deck to make cutting of the excess grip tape (using the razor blade 114) easier and cleaner.

The die 116 is preferably affixed in one end of the case 102. The die 116 includes cutting threads that are sized to match the standard thread size used on conventional skateboard truck axles. Rotation of the die 116 forms or repairs external threads. The die 116 is particularly useful to rethread damaged ends of truck axles when necessary to replace the skateboard wheels. To this end, the die 116 and its corresponding mounting cavity are designed and configured to provide enough space/clearance to receive and accommodate the end of a truck axle.

The threaded insert 122 is located on the back side of the tool 100. The threaded insert 122 is configured to receive a thumb screw 218 that in turn secures a phone mount to the side of the case 102 (see FIGS. 20-25). The threaded insert 124 is located on the bottom side of the tool 100. The threaded insert 124 is configured to receive a threaded tip 228 of a tripod 200 (see FIG. 23). The threaded inserts 122, 124 and/or other threaded inserts (not shown) can also be used to attach other accessories, tools, or components to the case 102 if so desired.

Referring to FIGS. 1-4, the fitting of the drive ratchet 120 is exposed at the top side of the case 102. Referring to FIGS. 5-8 the drive ratchet 120 includes a toggle switch 121, which is exposed at the bottom side of the case 102. The drive ratchet 120 may also include a button release feature for purposes of removing compatible tools from its fitting. The toggle switch 121 is manipulated (turned clockwise or counterclockwise) to change the direction of the drive ratchet 120—to tighten or loosen the nuts. The ratchet cap 126 is realized as a clip-in or screw-in part to secure and hold the drive ratchet 120 within the case 102. As clearly shown in FIGS. 1-8, the drive ratchet 120 is installed in a longitudinally offset location of the case 102 (i.e., biased toward the right side or the left side) such that the case 102 serves as an efficient and effective moment arm when the drive ratchet 120 is used. In other words, the offset position of the drive ratchet 120 enables the user to efficiently apply torque to nuts while using the case 102 as a handle.

As shown in FIGS. 1-14, the tool 100 is relatively compact and easy to carry, and all of the removable tools are readily accessible from the outside of the case 102, and are easy to remove and replace as needed. Moreover, the tool 100 is appropriately shaped and sized to function as a handle to provide a good grip and leverage when using the socket tools 106, 108, 110, when using the die 116, and when using the file 118. In addition, the tool 100 is shaped to provide a comfortable grip with its ergonomic design. To this end, the bottom side of the case 102 is relatively smooth and contoured to fit the user's hand when the case 102 is seed as a handle for the drive ratchet 120. The size of the tool 100 is compact, which provides the benefit of being comfortable to carry in a pocket, backpack, gear bag, etc.

Figure 15:
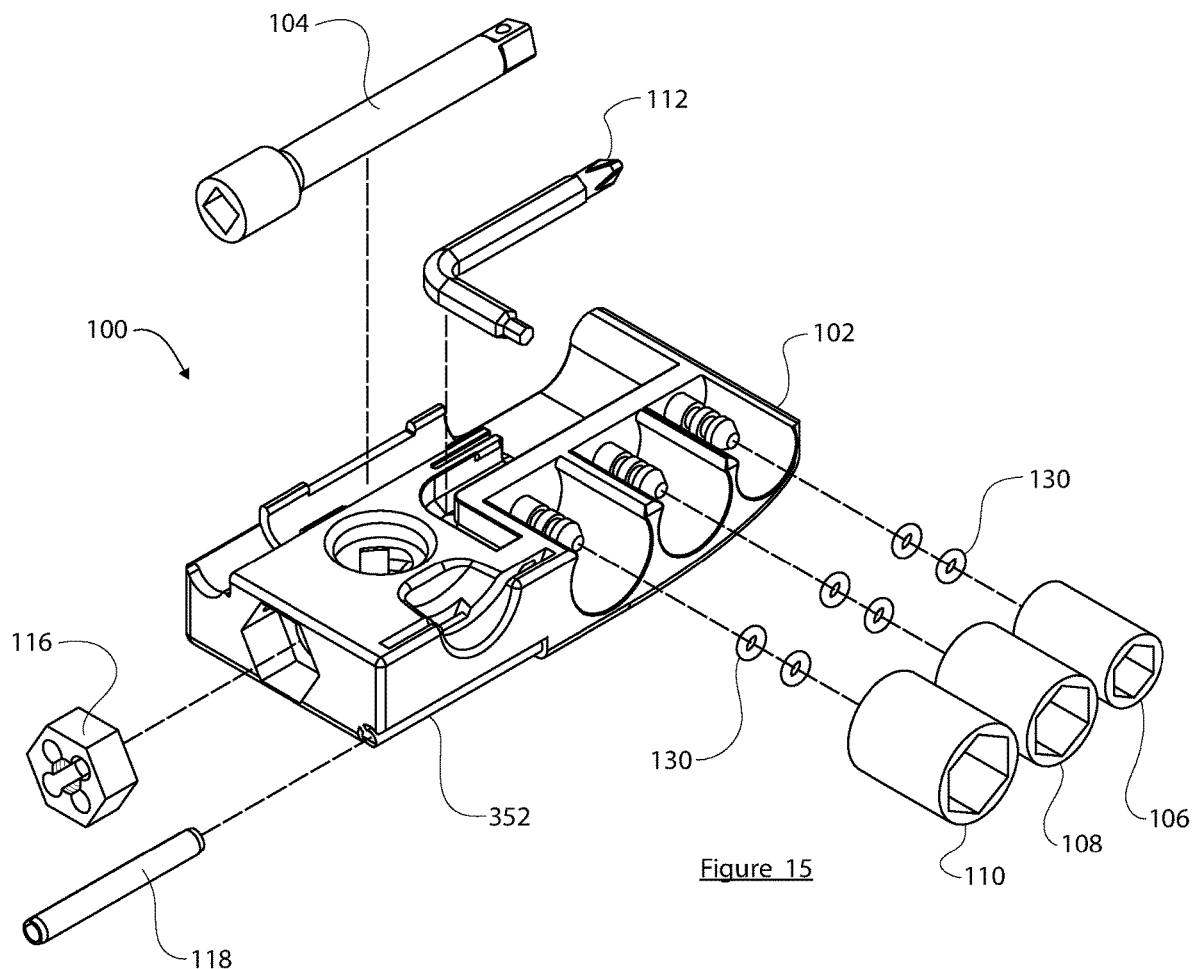
FIG. 15 is an exploded perspective view of the skateboard tool.

FIG. 15 is an exploded perspective view of the skateboard tool 100. FIG. 15 shows the case 102 by itself, with the other parts removed therefrom. FIG. 15 shows the bar extension tool 104 and its corresponding retaining feature (which is integrally formed in the top side of the case 102 for this embodiment), the wrench tool 112 and its corresponding retaining feature (which is integrally formed in the top side of the case 102 for this embodiment), and all three socket tools 106, 108, 110 and their corresponding retaining features (which are integrally formed in the top and front sides of the case 102 for this embodiment). These retaining features are suitably designed and configured to allow the tools to be removed from the case 102 and returned to the case 102 on demand as needed. In this regard, these retaining features are shaped, sized, and otherwise configured to secure the tools to the case in a removable or releasable manner.

FIG. 15 also shows the die 116 and the file 118 separated from the case 102. However, after assembly and manufacturing, the die 116 and the file 118 are intended to remain in place and are not designed to be easily removed from the case 102. FIG. 15 shows the cavity that receives the die 116 and the slotted receptacle that receives the file 118 in accordance with this particular embodiment. FIG. 15 also shows o-rings 130 that are located on stems (formed in the case 102) to help hold the socket tools 106, 108, 110 in place. More specifically, for the illustrated embodiment, each stem includes two circumferential grooves that receive the o-rings 130. The o-rings 130 are sized to provide a press/friction fit for the socket tools 106, 108, 110. It should be appreciated that the die 116, the file 118, and the socket tools 106, 108, 110 can be secured to the case 102 using alternative and/or additional structures or features than those shown in the figures, as desired for the particular implementation. Some of the features shown in FIG. 15 are described in more detail below with reference to other figures.

Figure 16:
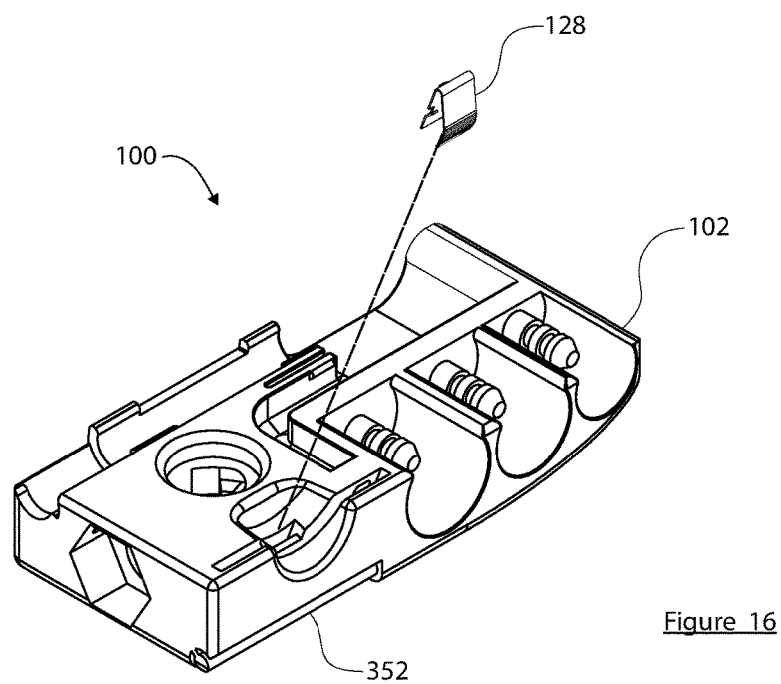
FIG. 16 is a perspective top view of the skateboard tool's case, showing a retaining clip removed therefrom.

FIG. 16 is a perspective top view of the case 102 of the skateboard tool 100, showing a spring clip 128 removed therefrom. FIG. 16 illustrates a retaining feature integrally formed in the case 102 for receiving the spring clip 128. The spring clip 128 snaps in place into the case 102 and engages structure of the case 102 to hold itself in place. FIG. 16 depicts an exemplary embodiment of the spring clip 128, although other types can also be used. The spring clip 128 functions to secure the razor blade 114 in the case 102 for storage.

Figure 17:
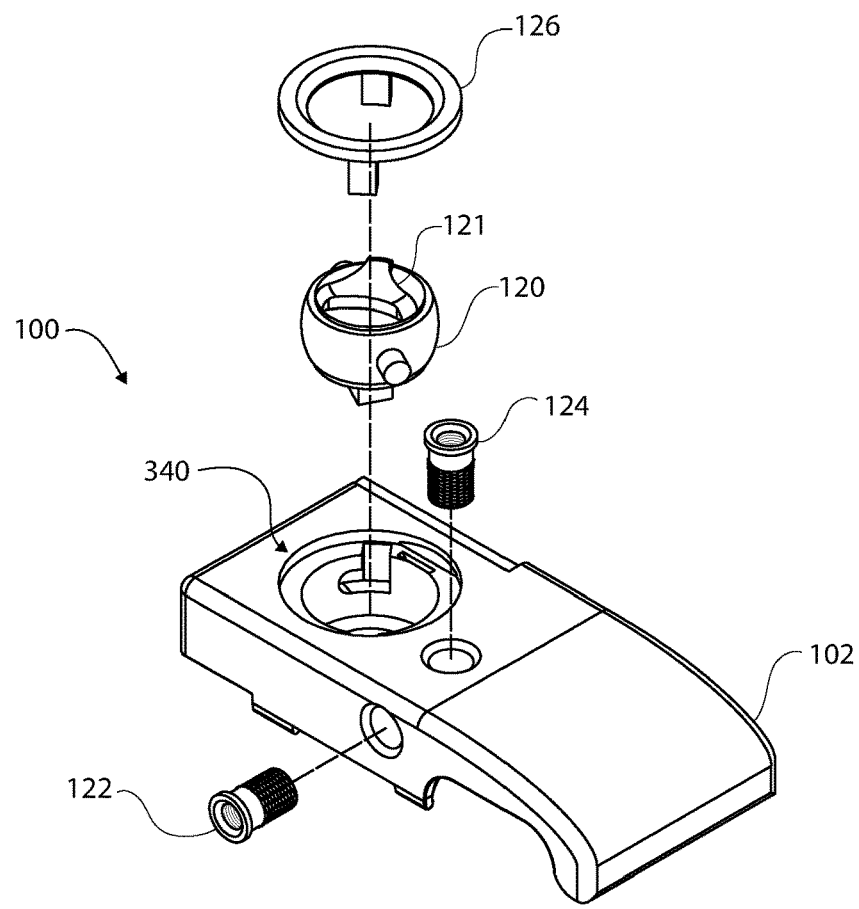
FIG. 17 is a perspective bottom view of the skateboard tool, showing various components removed therefrom.

FIG. 17 is a perspective bottom view of the skateboard tool 100, showing the following components removed therefrom: the two threaded inserts 122, 124; the drive ratchet 120; and the ratchet cap 126. In practice, the threaded inserts 122, 124 can be installed via an interference fit, by an adhesive, by a hot melting process, by a molding process, or the like. During assembly of the tool 100, the drive ratchet is inserted into the bottom of the case as shown in FIG. 17, and twisted to engage a retaining slot or collar. Thereafter, the ratchet cap 126 is installed overlying the drive ratchet 120 to hold the drive ratchet 120 in place within the case 102. The case 102 and its features can be designed as needed for compatibility with different types of drive ratchet assemblies, and the embodiment shown represents only one suitable possibility.

Figure 18:
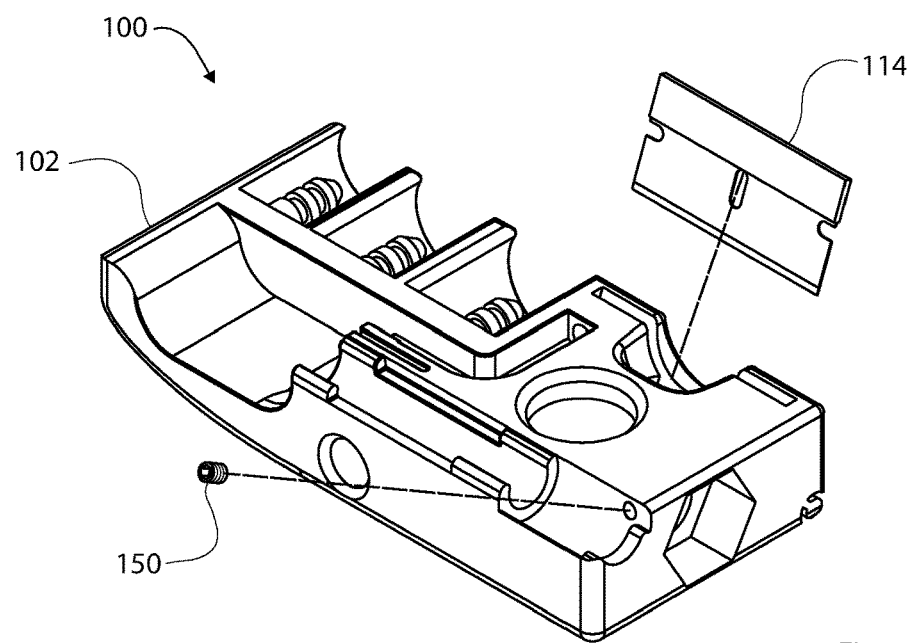
FIG. 18 is a top perspective view of the skateboard tool, showing a razor blade and a set screw removed therefrom.

FIG. 18 is a top perspective view of the skateboard tool 100, showing the razor blade 114 and a set screw 150 removed therefrom. The razor blade 114 is held within a suitably shaped and sized slot formed in the case 102, and is held in place with the spring clip 128 (hidden from view in FIG. 18). Of course, the sharp edge of the razor blade 114 is inserted into the case 102 to keep it well protected. The set screw 150 is used in this implementation to hold the die 116 in place within the case 102 and to prevent the die 116 from rotating during use. In certain embodiments, the set screw 150 need not be used the die 116 can be held in place using other components, an adhesive, or the like.

Figure 19:
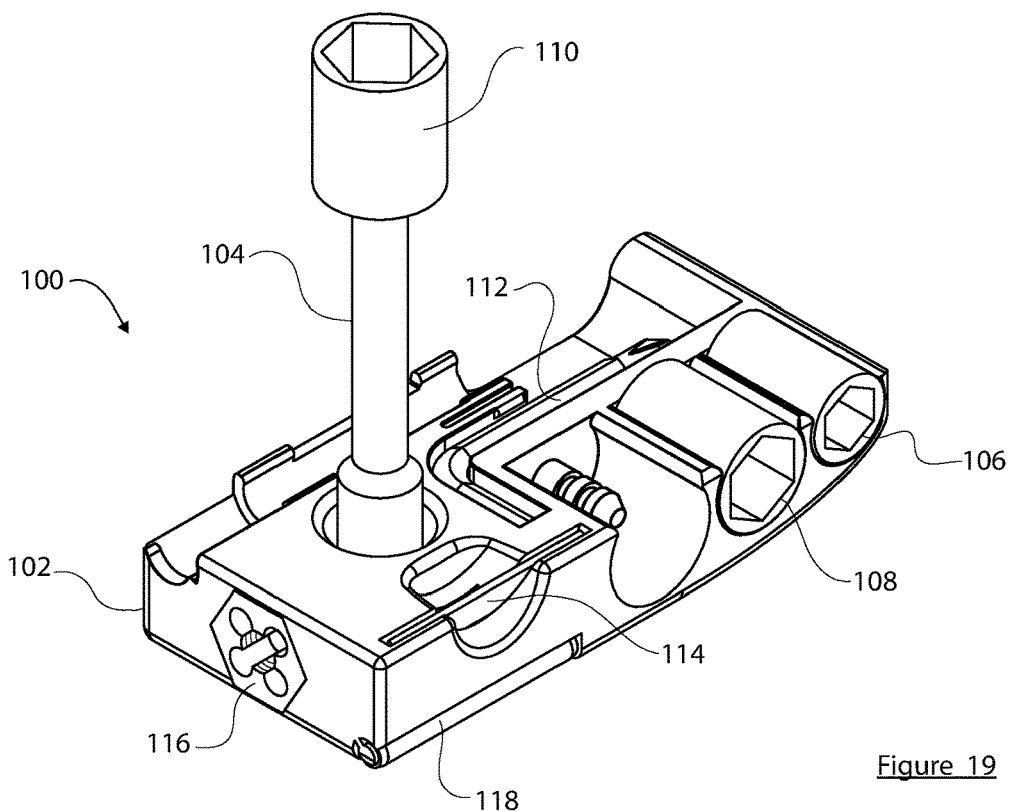
FIG. 19 is a top perspective view of the skateboard tool with a socket and bar extension attached.

FIG. 19 is a top perspective view of the skateboard tool 100 with the socket tool 110 and bar extension tool 104 attached to the drive ratchet 120 (hidden from view). The fitting of the drive ratchet 120 is compatible with the female end of the bar extension tool 104 and with the female end of each of the socket tools 106, 108, 110. Accordingly, the fitting of the drive ratchet 120 is suitably configured to receive the socket tools 106, 108, 110 and the bar extension tool 104 for the sockets as needed. In this state, the tool 100 can be used as a socket driver to tighten or loosen the kingpin nut on the skateboard truck. To accommodate such usage, the bar extension tool 104 should be long enough to provide sufficient clearance between the truck mounting baseplate (where the truck mounting nuts are located) and the outer contact surface of the skateboard wheels to allow the user to install and remove the truck mounting nuts without interference. In certain embodiments, the bar extension tool 104 is three inches long to provide the desired amount of clearance. Of course, the exact length of the bar extension tool 104 can be more or less than three inches, as appropriate to the particular application.

As shown in FIG. 19, when the bar extension tool 104 is installed on the fitting of the drive ratchet 120, the bar extension tool 104 is perpendicular (or nearly perpendicular, as practical) to the major plane that is defined by the case 102. This perpendicular arrangement allows the case 102 to serve as a moment arm to efficiently apply torque to the bar extension tool 104 as needed. The perpendicular arrangement also allows the bar extension tool 104 to serve as a lever/handle when the threading die 116 is in use. More specifically, after the threading die 116 is installed onto the end of the skateboard truck axle, the user can hold the case 102 with one hand, and the bar extension tool 104 with the other hand, while rotating the case 102 (and the threading die 116) around the axle.

The socket tool 110 can be replaced with the other socket tools 106, 108 if needed for adjustment of the truck mounting hardware or axle nuts. After use, the socket tool 110 can be returned to the appropriate retaining feature of the case 102. Likewise, the bar extension tool 104 can be returned to its respective retaining feature on the case 102.

Figure 20:
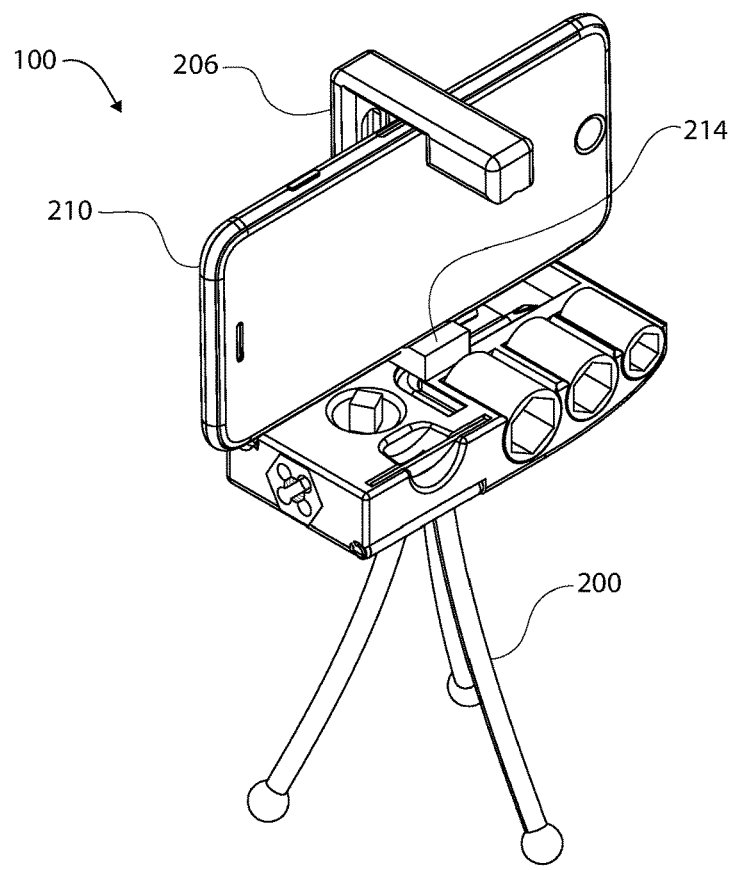
FIG. 20 is a front perspective view of the skateboard tool being used as a phone mount.
Figure 21:
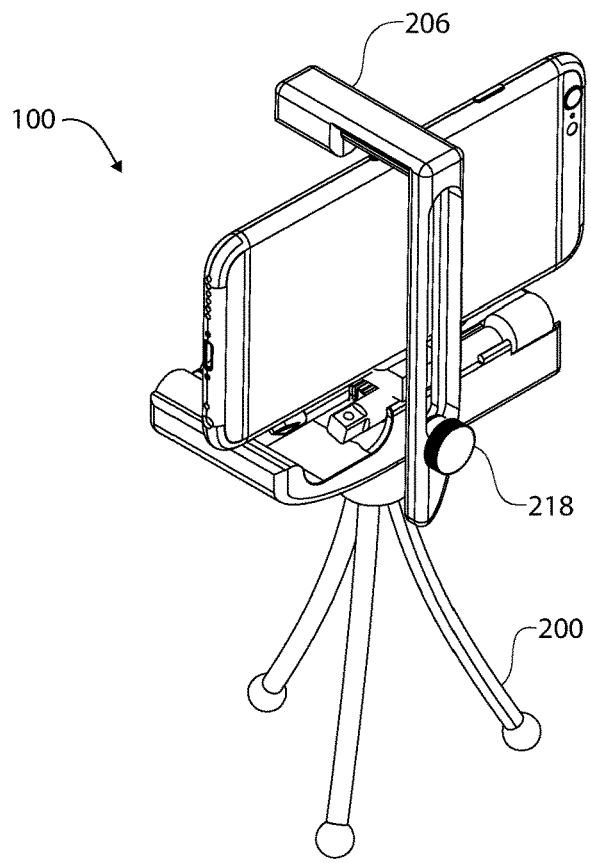
FIG. 21 is a back perspective view of the skateboard tool being used as a phone mount.
Figure 22:
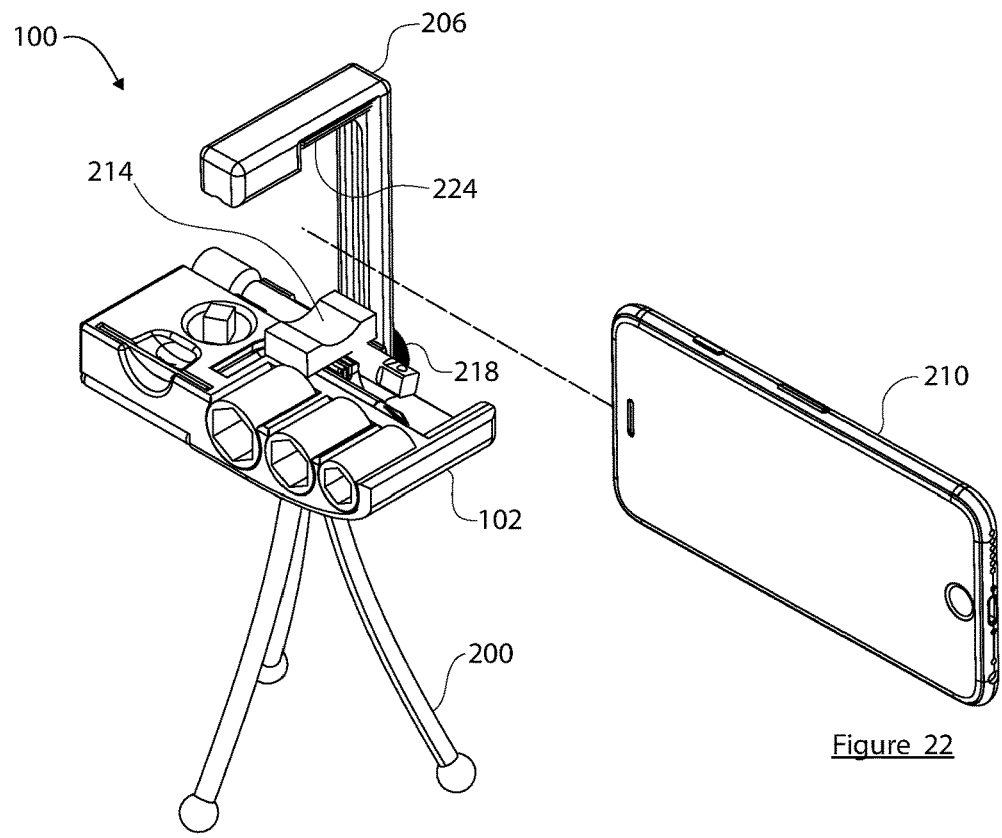
FIG. 22 is a front perspective view of the skateboard tool, showing the manner in which a phone can be introduced for holding.
Figure 23:
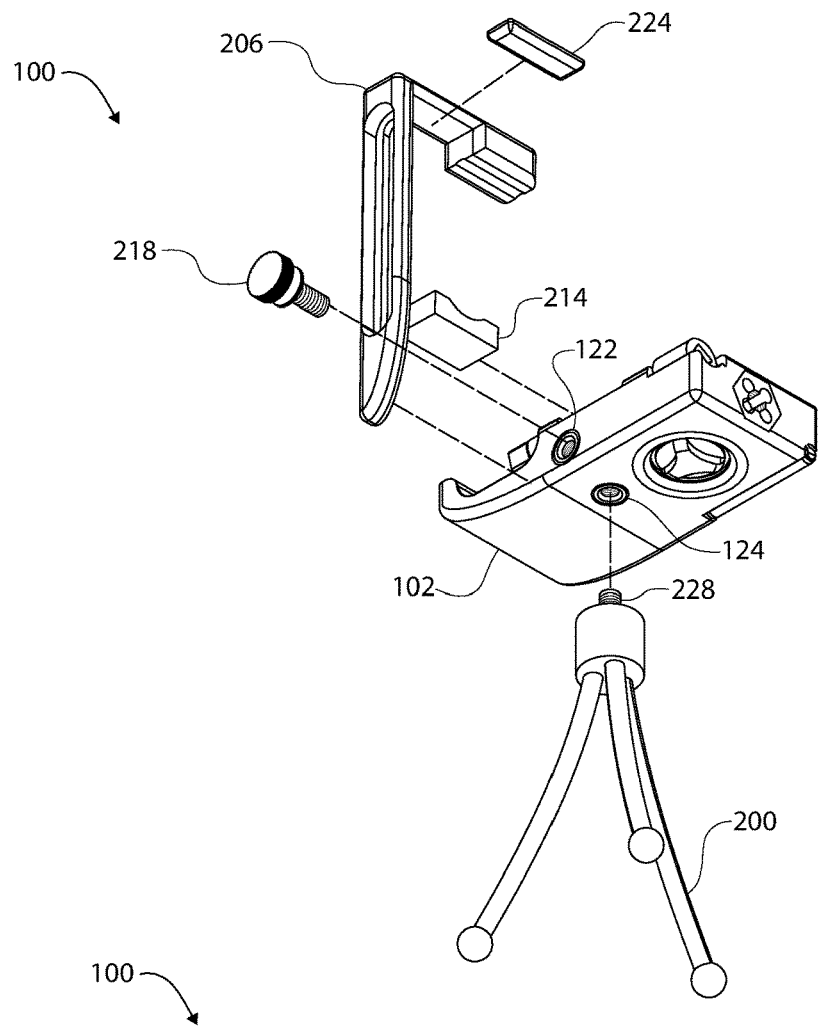
FIG. 23 is an exploded perspective view of the skateboard tool, with its phone mount components.
Figure 24:
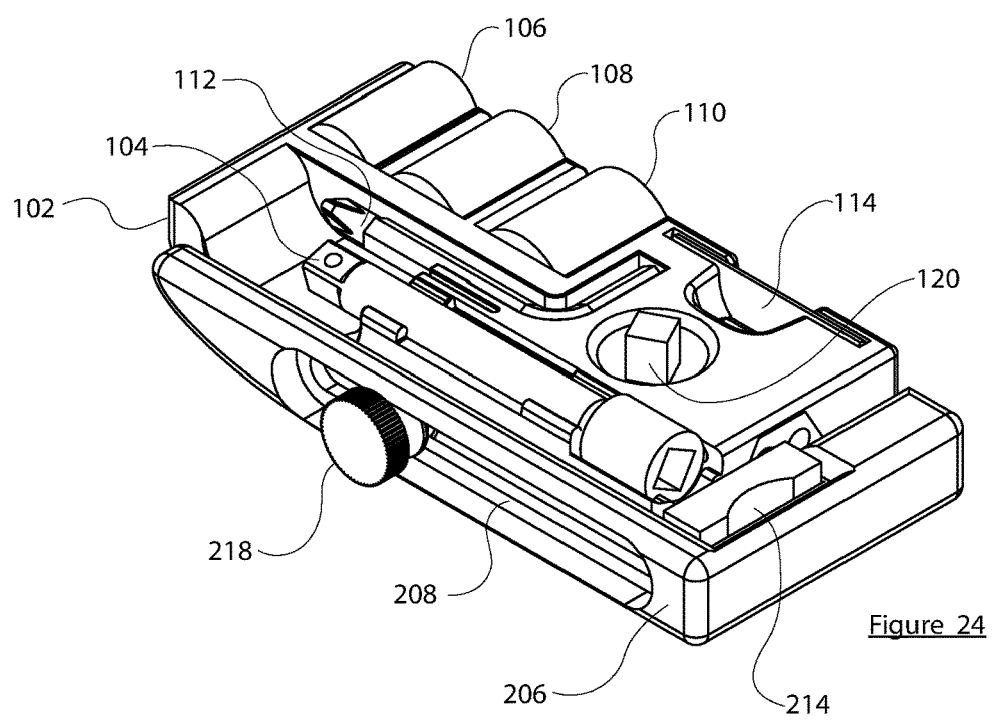
FIG. 24 is a back perspective view of the skateboard tool, with the phone mount in its stored position.
Figure 25:
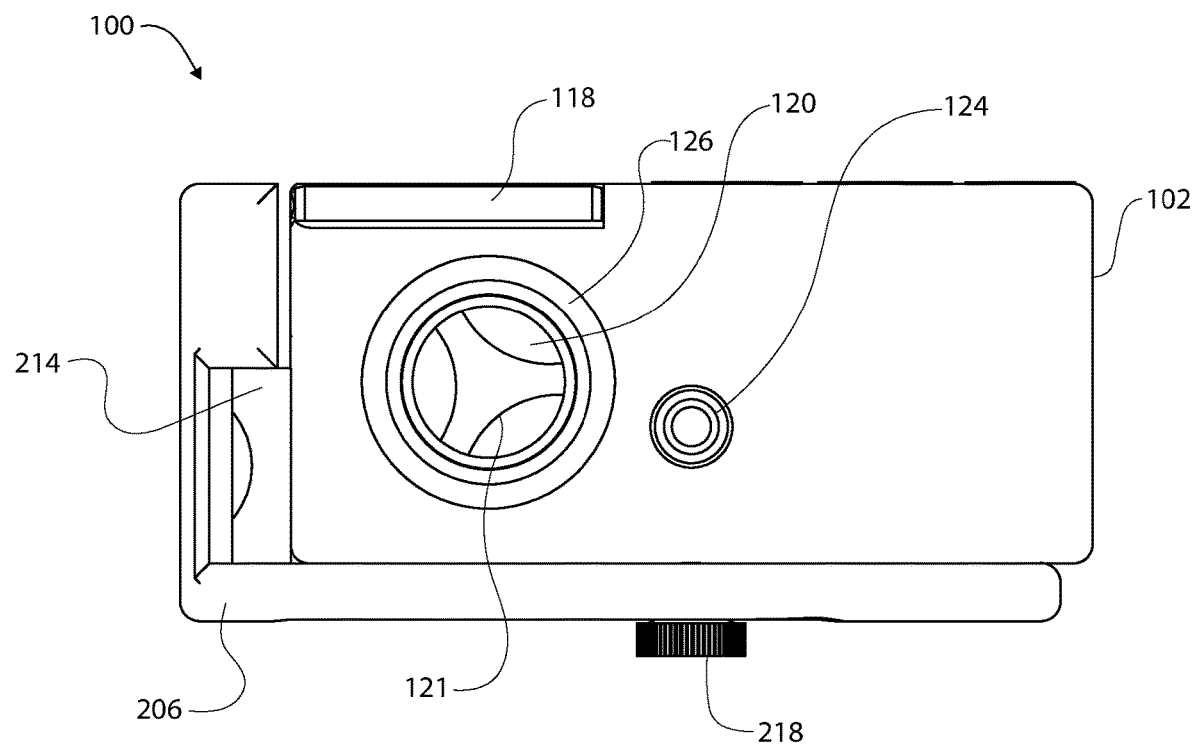
FIG. 25 is a bottom view of the skateboard tool, with the phone mount in its stored position.
Figure 26:
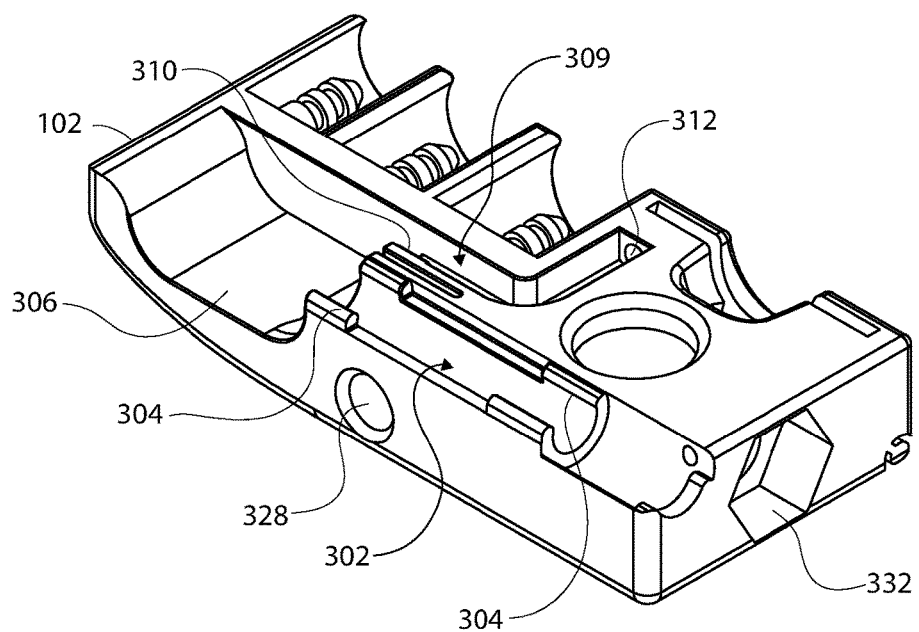
FIGS. 26-29 are top perspective views of the case of the skateboard tool.
Figure 27:
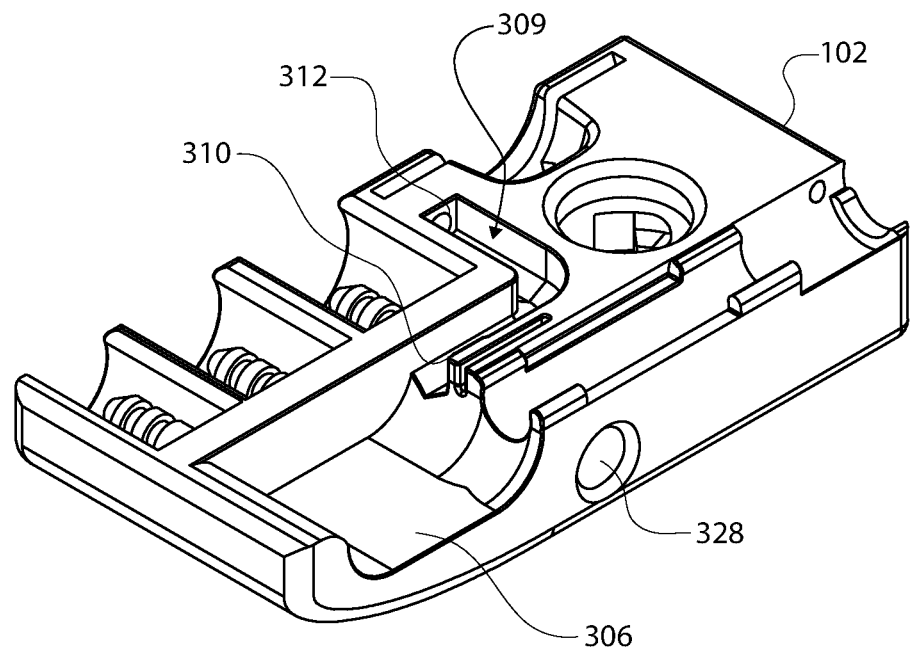

FIGS. 20-25 show an enhanced feature of the skateboard tool 100. In particular, FIGS. 20-25 show a phone mount arm 206 that removably attaches to the case 102 to hold a mobile device (e.g., a cell phone, a camera, a video game device) in place. FIGS. 20-23 also show a tripod 200 that removably attaches to the bottom of the case 102 to support the tool 100 when it is used as a phone mount as shown. More specifically, FIG. 20 is a front perspective view of the skateboard tool 100 being used as a phone mount, FIG. 21 is a back perspective view of the skateboard tool 100 being used as a phone mount, FIG. 22 is a front perspective view of the skateboard tool 100, showing the manner in which a phone can be introduced for holding, FIG. 23 is an exploded perspective view of the skateboard tool 100, with its phone mount components, FIG. 24 is a back perspective view of the skateboard tool 100, with the phone mount in its stored position, and FIG. 25 is a bottom view of the skateboard tool 100, with the phone mount in its stored position. FIGS. 20 and 21 demonstrate how the mount arm 206 is designed and configured to hold a mobile device in an orientation that is intended to support a camera function of the mobile device.

With continued reference to FIGS. 20-25, the phone mounting feature cooperates with two primary components: the mounting assembly (which includes the phone mount arm 206, and a slider pad 214 movably coupled to the phone mount arm 206); and the tripod 200. The tripod 200 includes the threaded tip 228 so that the tripod 200 can be threaded into the threaded insert 124 of the case 102. This allows the case 102 to serve as a support platform for a phone 210 (or any suitably sized mobile device). The tripod 200 (when threaded into the threaded insert 124) also functions as a handle to make it easier for the user to take pictures and videos when a phone or other camera-featured device is held by the phone mount arm 206. For example, a videographer can hold onto the legs of the tripod 200 while capturing video of a skateboarder. This handle option is especially useful for "follow filming" during which the videographer skateboards near or behind a skateboarder who is being filmed. Although not shown, the case 102 could also include a feature or an additional component designed to hold or store the tripod 200 when not in use.

The phone mount arm 206 is held in the desired clamping position overlying the edge of the phone 210 (see FIGS. 20 and 21) and is secured in place by way of the thumb screw 218, which, when screwed into the threaded insert 122, maintains the phone mount arm 206 in the secured orientation and position. The phone mount arm 206 includes a longitudinally oriented slot 208 formed therein (see FIG. 24 for a clear view of the slot 208) that receives the thumb screw 218. Thus, when the thumb screw 218 is loose, the phone mount arm 206 can freely slide up and down by way of the slot 208. This allows the user to adjust the clamping position and force of the phone mount arm 206 on the top edge of the phone 210. After moving the phone mount arm 206 into the proper position relative to the case 102, the thumb screw 218 can be tightened to secure the phone 210 to the case 102.

The slider pad 214 is also slidably coupled to the phone mount arm 206 by way of the slot 208. The slider pad 214 may include a key/keyway feature or a snap-fit feature that allows it to be attached and retained within the slot 208 in a way that still allows it to slide freely as needed. The slider pad 214 is retained within the slot 208 (above the screwed-in position of the thumb screw 218) such that it can move up and down as needed. The slider pad 214 can be formed from a soft resilient material such as rubber to protect the bottom edge of the phone 210 and to provide a secure support platform for the phone 210. When the phone 210 is in the desired mounted position (see FIGS. 20 and 21), the bottom edge of the phone 210 rests against the slider pad 214, and the top edge of the phone 210 rests against a resilient pad of the phone mount arm 206, such as an adhesive rubber pad 224 that is affixed to the lower surface of the horizontal extension of the phone mount arm 206.

It should be appreciated that the slider pad 214 is an optional element that need not be used. Instead, the mount arm 206 can be used by itself to clamp the phone 210 directly against a surface or a feature of the case 102 and/or against one or more of the tools held in the case 102. Indeed, the bottom edge of the phone 210 can be positioned to rest against a surface, a feature, or a tool to achieve a desired orientation or camera angle.

Skateboarders are notorious for capturing video and picture footage of themselves and others while performing daring skateboard tricks. The phone mounting and tripod feature of the tool 100 makes it easy and convenient to set up a mobile phone in a safe, secure, and stable manner. Accordingly, this feature adds fundamental benefits to the skateboard tool 100. This is the very first skateboard tool to incorporate filming capabilities in use with a skateboard tool.

Referring to FIGS. 24 and 25, the phone mount arm 206 can be stored in a compact manner on one side of the case 102. As shown in these figures, the L-shape of the phone mount arm 206 follows the outer perimeter of the case 102, the slider pad 214 is moved to an uppermost position on the phone mount arm 206, and the thumb screw 218 is tightened into the threaded insert 122 to hold the phone mount arm 206 in place. Alternatively, the user can store the phone mount arm 206 separately from the case 102 if so desired.

Figure 34:
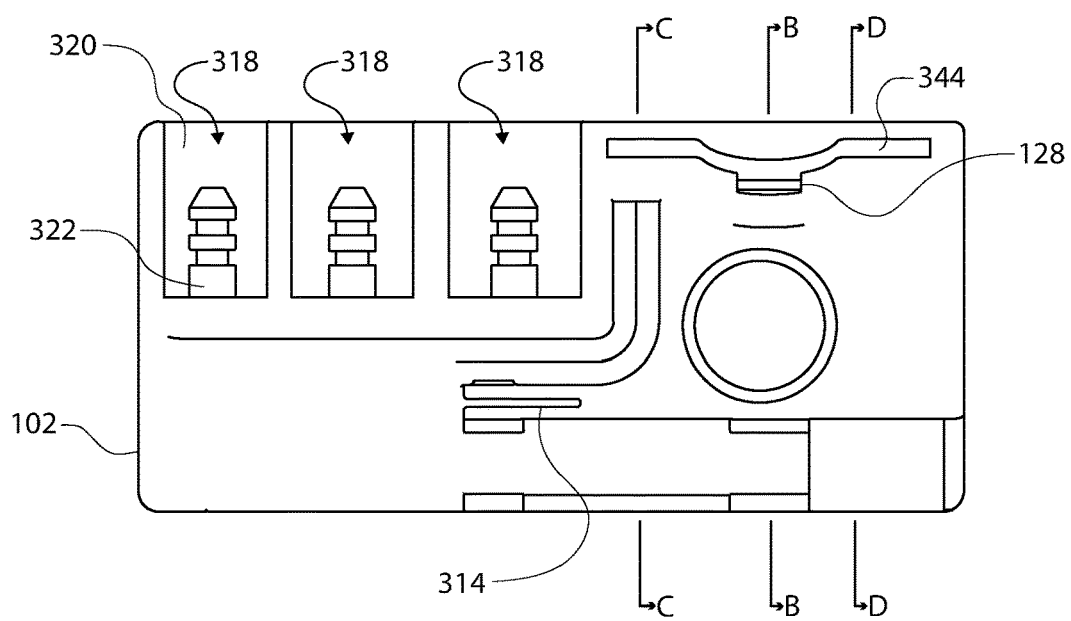
FIG. 34 is a top view of the case of the skateboard tool.
Figure 35:
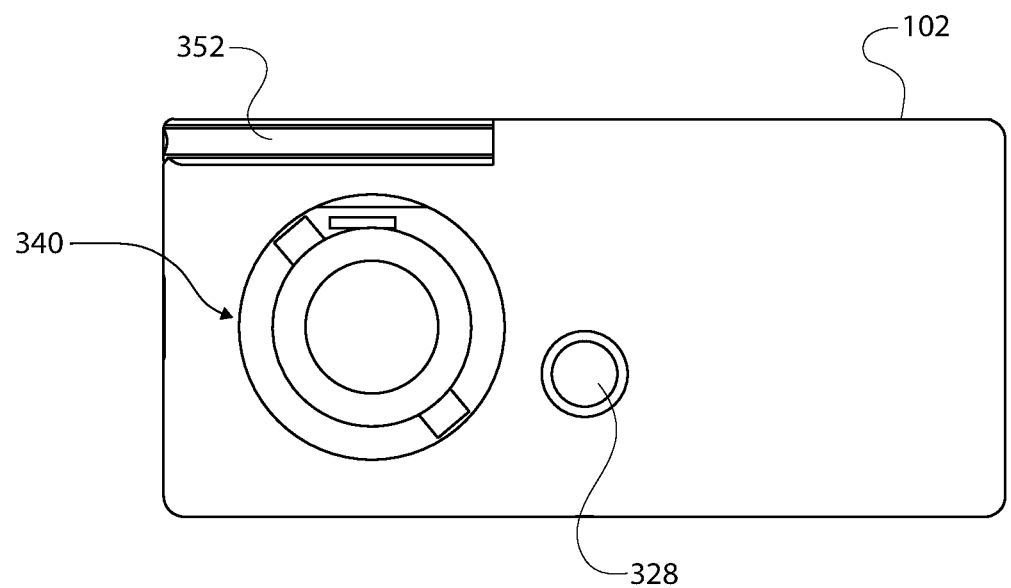
FIG. 35 is a bottom view of the case of the skateboard tool.
Figure 36:
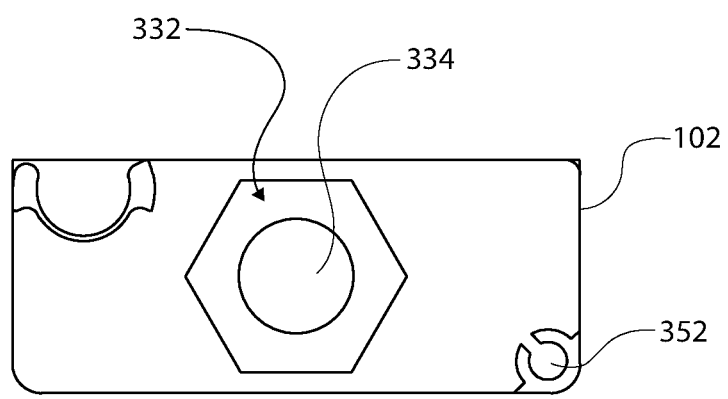
FIG. 36 is a left view of the case of the skateboard tool.

FIGS. 26-36 are different views of the case 102 by itself. More specifically, FIGS. 26-29 are different top perspective views of the case 102 of the skateboard tool 100, FIGS. 30-33 are bottom perspective views of the case 102, FIG. 34 is a top view of the case 102, FIG. 35 is a bottom view of the case 102, and FIG. 36 is a left side view of the case 102. This set of figures depicts the case 102 alone, without any tools or components installed therein.

Referring primarily to FIGS. 26-36, a first retaining feature 302 is shaped, sized, and configured to accommodate the bar extension tool 104 by way of a snap-fitting engagement. Accordingly, the first retaining feature 302 functions as a bar extension retaining feature that is suitably configured to secure the bar extension tool 104 to the case in a removable manner. In this regard, the bar extension tool 104 can be removably coupled to the case via the bar extension retaining feature. For this embodiment, the first retaining feature 302 includes a plurality of tabs 304 (e.g., four tabs) that impart clamping force to the sides of the bar extension tool 104 when the bar extension tool 104 is seated and secured within the first retaining feature 302. For the illustrated embodiment, the four tabs 304 are positioned at the uppermost ends of the first retaining feature 302, and each tab 304 protrudes inward. Thus, the tabs 304 flex outward when the bar extension tool 104 is pressed down and into the first retaining feature 302, and snap back after the bar extension tool 104 is seated to retain the bar extension tool 104 in place. The first retaining feature 302 is designed such that the bar extension tool 104 can be easily removed as needed by pulling on the bar extension tool 104. Although not always required, the first retaining feature 302 is located on the top of the case 102, and at or near the back side of the case 102. In other embodiments, the first retaining feature 302 can be located elsewhere on the case 102.

The case 102 includes a finger slot 306 formed therein to make it easier for the user to remove the bar extension tool 104. The finger slot 306 is realized as a shallow indentation located at one end of the first retaining feature 302. The finger slot 306 is shaped, sized, and located such that a gap is formed underlying an end of the bar extension tool 104 when the bar extension tool 104 is seated in its stored position (see FIGS. 3, 4, 7, and 12). The finger slot 306 allows the user to slide a fingertip under the end of the bar extension tool 104 to easily release the bar extension tool 104 from the first retaining feature 302.

Figure 28:
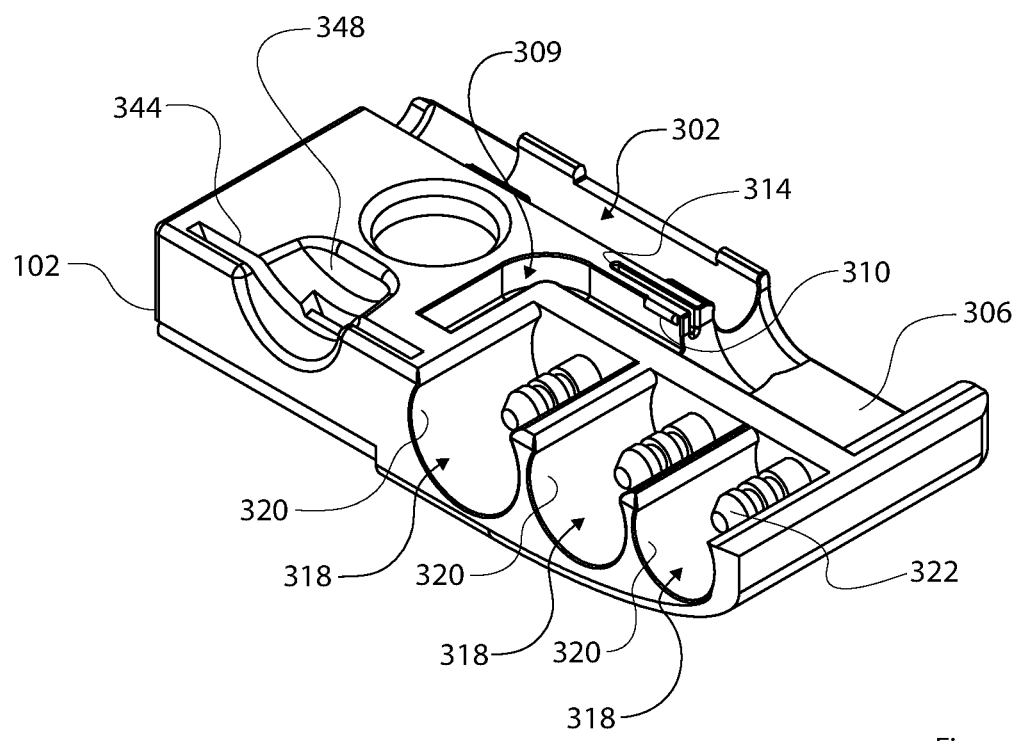
Figure 29:
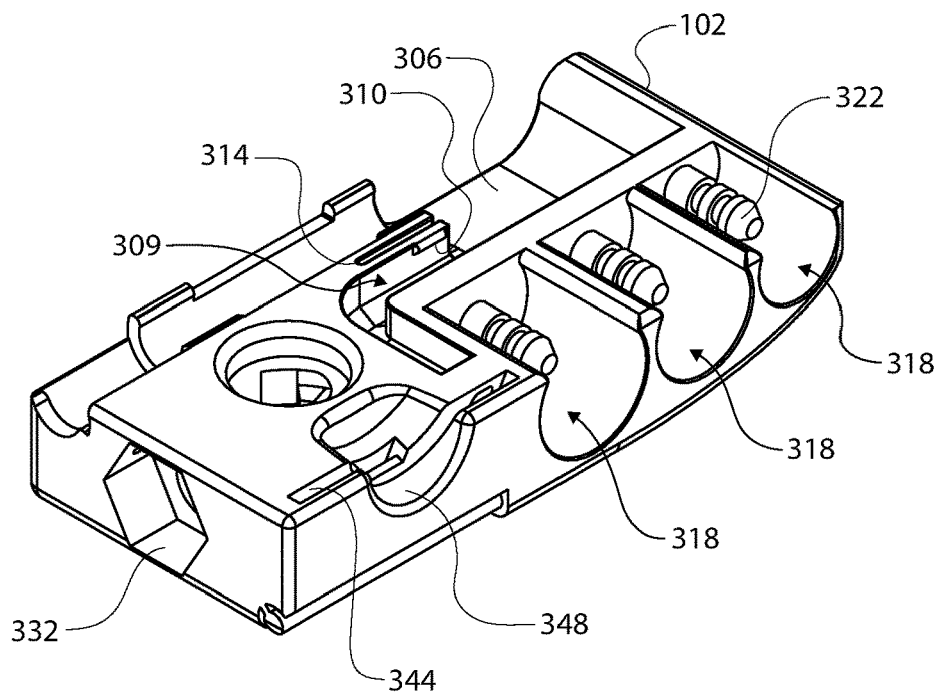
Figure 39:
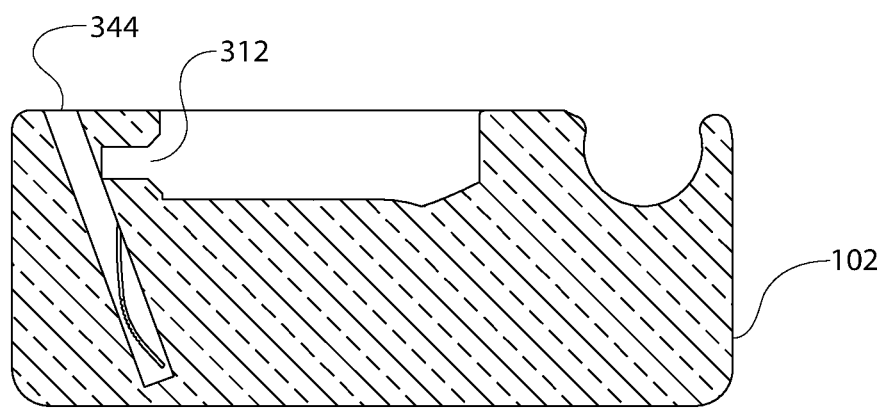
FIG. 39 is a cross sectional view taken along line C-C shown in FIG. 34.
Figure 40:
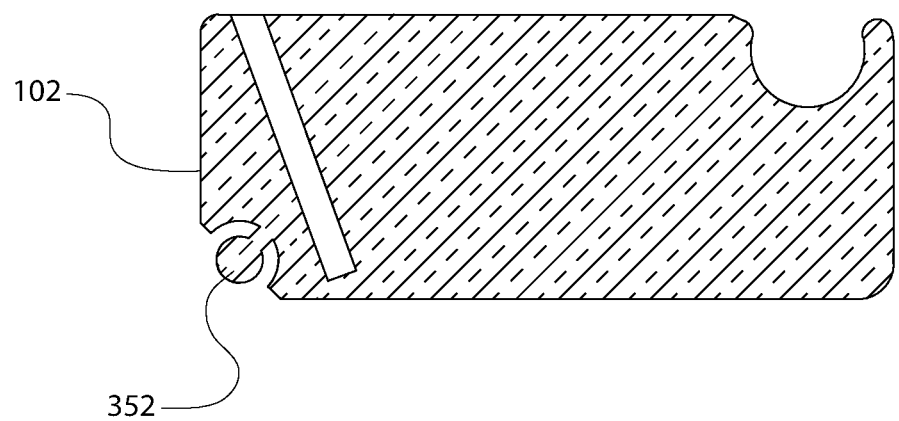
FIG. 40 is a cross sectional view taken along line D-D shown in FIG. 34.

The case 102 also includes a second retaining feature 309 for the wrench tool 112. Accordingly, the second retaining feature 309 functions as a wrench retaining feature that is suitably configured to secure the wrench tool 112 to the case in a removable manner. For the illustrated embodiment, the second retaining feature 309 is shaped, sized, and configured to accommodate the wrench tool 112 by way of a snap-fitting engagement along one arm of the wrench tool 112. In addition, the second retaining feature 309 includes a wrench hole 312 to receive a tip/end of the wrench tool 112 (see FIG. 26 and FIG. 39, which is a cross section that shows the wrench hole 312). For this embodiment, the wrench hole 312 is configured to receive the allen head end of the wrench tool 112. The second retaining feature 309 includes at least one protrusion or tab 310 that imparts clamping force to one or more sides of the wrench tool 112 when the wrench tool 112 is seated and secured within the second retaining feature 309. The case 102 includes a relief slot 314 formed behind the tab 310, as best shown in FIGS. 28, 29, and 34. The relief slot 314 creates a resilient wall for the tab 310; the wall flexes by a desired amount to provide the required clamping force for the tab 310. Although not always required, the second retaining feature 309 is located on the top of the case 102, in an approximately central position. When installed, the primary arm of the wrench tool 112 is parallel to the bar extension tool 104, as depicted in FIG. 9. In other embodiments, the second retaining feature 309 can be located elsewhere on the case 102.

Figure 4:
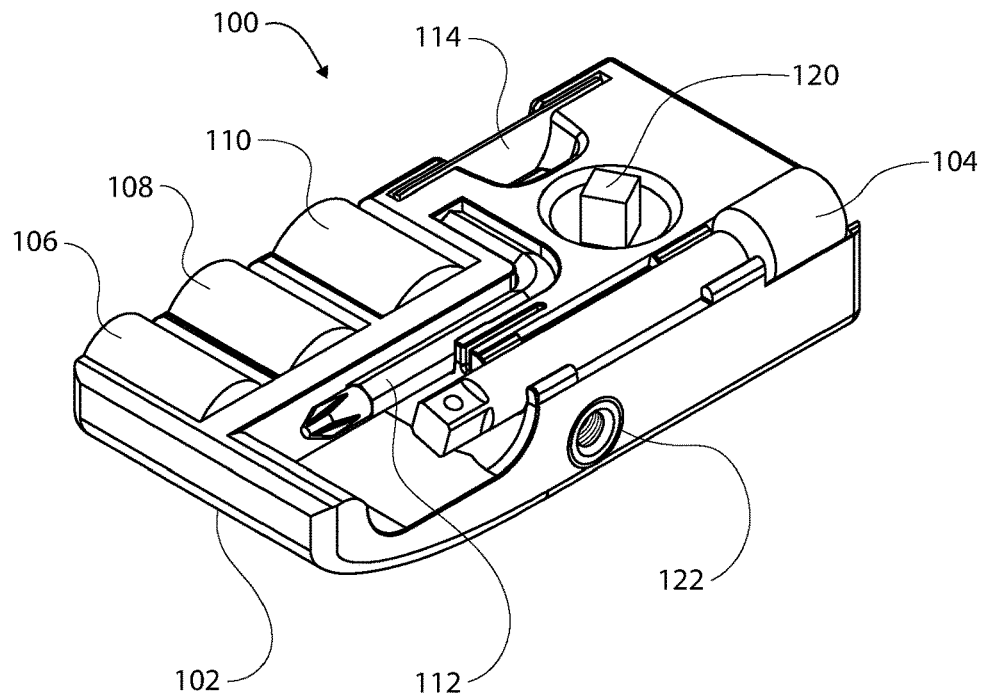
Figure 5:
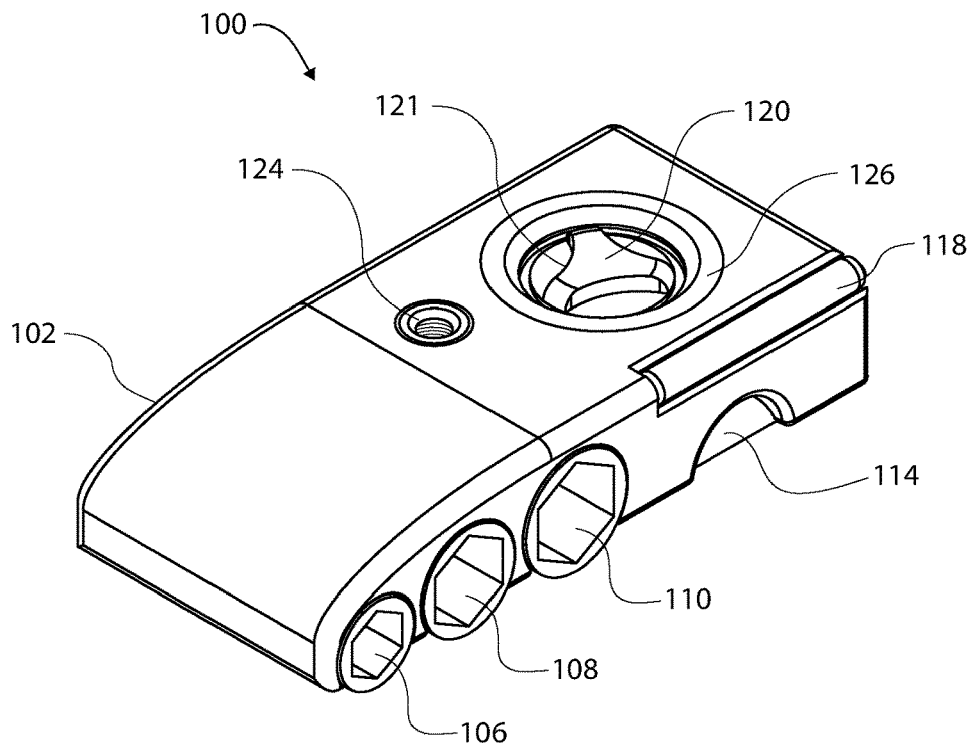
FIGS. 5-8 are different bottom perspective views of the skateboard tool.
Figure 6:
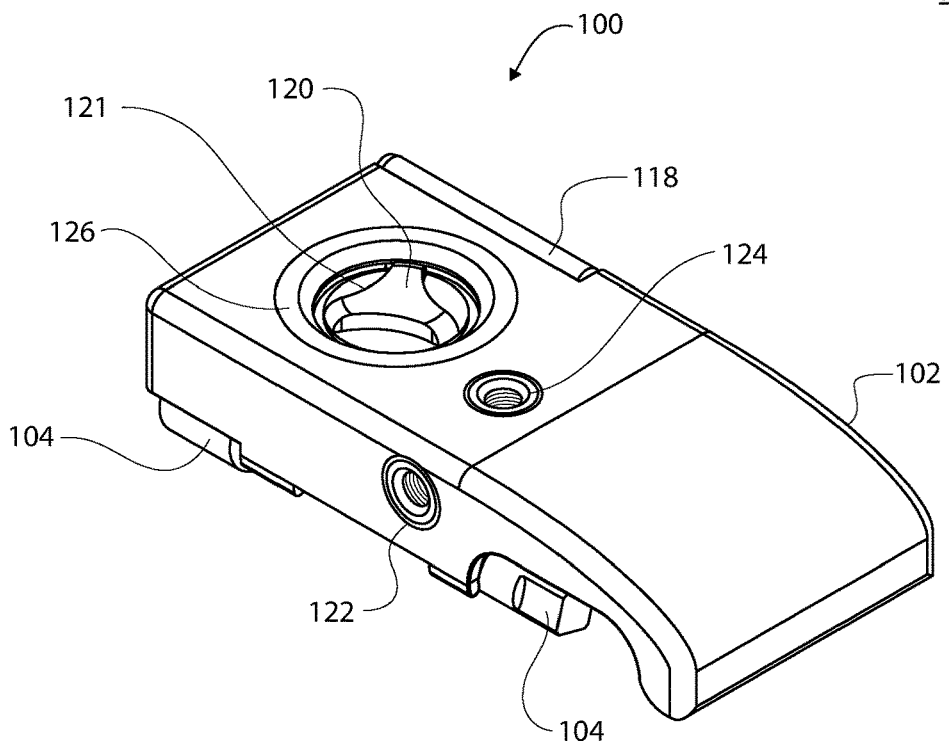
Figure 7:
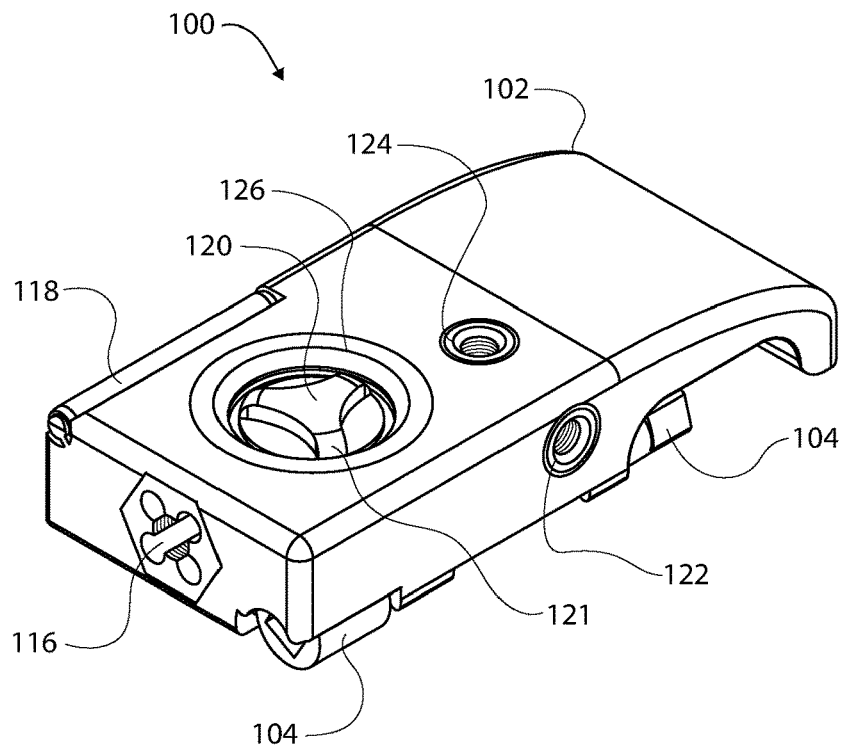
Figure 8:
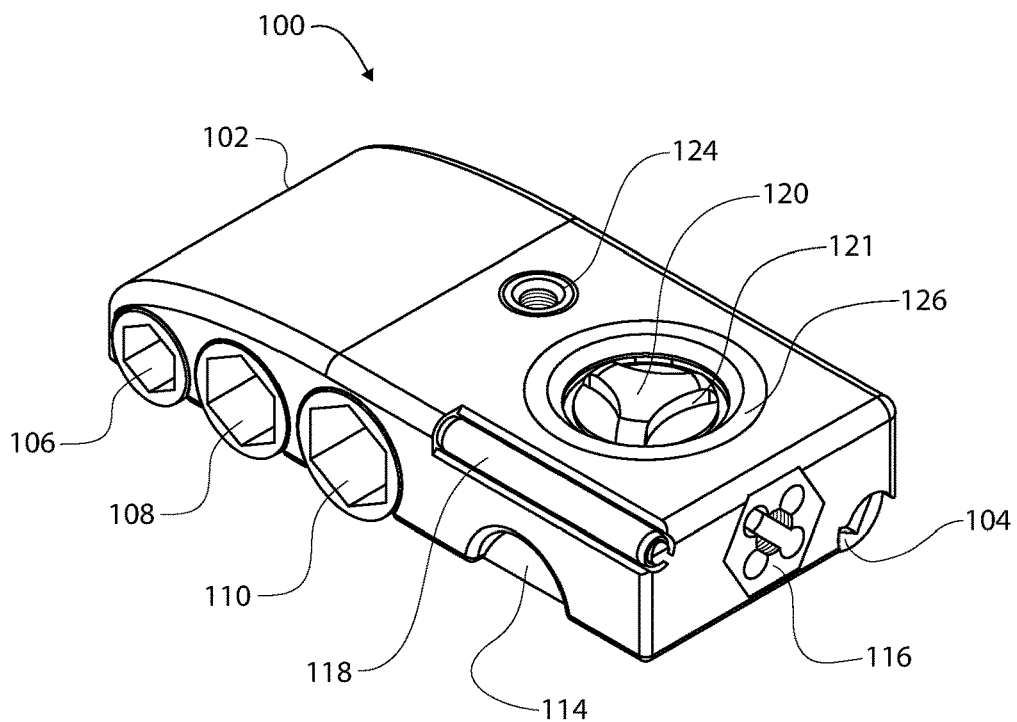

The wrench tool 112 is installed (and removably coupled to) the case 102 via the wrench retaining feature in the following manner. First, the allen head end of the wrench tool 112 is inserted into the wrench hole 312 to position one end of the wrench tool 112. Next, the primary arm of the wrench tool 112 is rotated downward into the second retaining feature 309 until it engages the tab 310. The force imparted by the tab 310 holds the wrench tool 112 in place. The finger slot 306 also helps the user during removal of the wrench tool 112. The finger slot 306 is shaped, sized, and located such that a gap is formed underlying an end of the wrench tool 112, namely, the phillips head end of the wrench tool 112. The finger slot 306 allows the user to slide a fingertip under the end of the wrench tool 112 to pry the wrench tool 112 from the second retaining feature 309. Notably, the finger slot 306, the first retaining feature 302, and the second retaining feature 309 are cooperatively configured such that the wrench tool 112 and the bar extension tool 104 can be easily removed from the case 102 independently from one another. As depicted in FIGS. 4, 9, and 12, the free end of the wrench tool 112 extends further toward the right side of the case, relative to the free end of the bar extension tool 104. This arrangement allows the user to selectively remove only the wrench tool 112 without having to also remove the bar extension tool 104, and vice versa.

It should be noted that the wrench hole 312 is optional. In alternative embodiments, the second retaining feature 309 can utilize additional tabs, compression features, or the like to releasably retain the wrench tool 112 in place without the use of the wrench hole 312. As another example, the case 102 may include a hole to receive the longer end of the wrench tool 112, along with a slot or cavity to receive the perpendicular (shorter) end of the wrench tool 112, such that the wrench tool 112 can be inserted into the case 102 and held in place by way of a press-fitting engagement, retaining features, a snap-fit, or the like.

Referring in particular to FIGS. 28, 29, and 34, the case 102 also includes third retaining features 318 for the socket tools 106, 108, 110. Each of the third retaining features 318 functions as a socket retaining feature that is suitably configured to secure a respective socket to the case in a removable manner. Each of the third retaining features 318 is shaped, sized, and configured to accommodate one of the three socket tools. Accordingly, the case 102 includes three differently sized versions of the third retaining feature 318. Although not always required, the third retaining features 318 are located on the front side of the case 102, at or near the right side. In other embodiments, the third retaining features 318 can be located elsewhere on the case 102.

Each of the third retaining features 318 is similarly designed and configured to removably hold a respective socket tool. To this end, each retaining feature 318 includes a partially cylindrical cavity 320 formed in the front side of the case 102, and a stem 322 protruding from the base of the partially cylindrical cavity 320. The stem 322 is positioned at what would be the center of the round cylindrical base. Each stem 322 has two circumferential grooves formed therein to receive two o-rings 130 (see FIG. 15), although more or less than two o-rings 130 can be utilized. The third retaining feature 318 holds its socket in place by a combination of compression of the o-ring 130 within the ratchet drive fitting end of the socket, in addition to slight friction or interference fit associated with the interior surface of the partially cylindrical cavity 320. In other words, the sockets are somewhat tightly fitted within their respective cavities 320.

It should be appreciated that other features and/or structures can be utilized to secure the socket tools to the case 102 if so desired. For example, and without limitation, the socket tools could be removably secured to the case 102 using magnets, snap-fitting features, a friction fit, clips, hold-down elements, or the like.

The preferred embodiment utilizes partially cylindrical cavities 320 rather than fully cylindrical cavities so that a portion of each socket tool (when properly installed in the cavities 320) remains exposed and protruding slightly above the major top surface of the case 102. This enables the user to easily push the sockets out the third retaining features 318 as needed. See FIGS. 1-4, which show the top edges of the socket tools 106, 108, 110 exposed and accessible.

The partially cylindrical cavities have a depth that approximates the height of the socket tools 106, 108, 110. Consequently, when the sockets are properly installed in (and removably coupled to) the case 102, they do not protrude significantly from the front side of the case 102 (see FIG. 1 and FIG. 2). This results in a clean look, a comfortable carry, and comfortable use.

Figure 30:
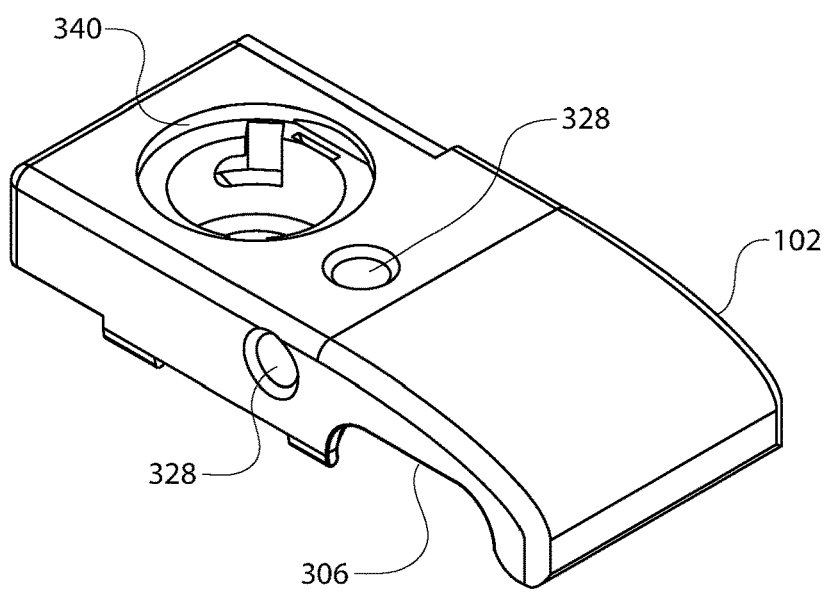
FIGS. 30-33 are bottom perspective views of the case of the skateboard tool.
Figure 31:
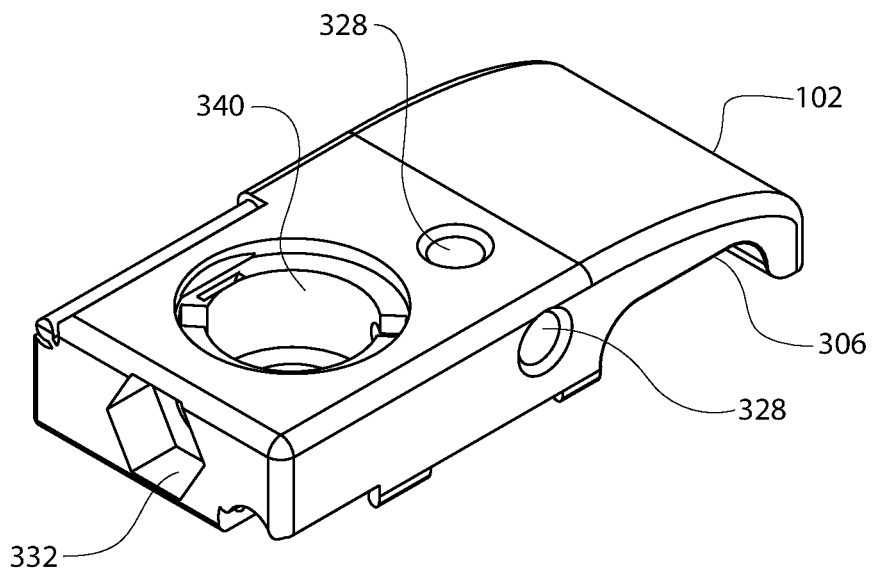

FIG. 30 and FIG. 31 both depict insert holes 328, which are shaped, sized, and configured to accommodate the threaded inserts 122, 124 (as described above). One insert hole 328 is formed in the back side of the case 102, and the other insert hole 328 is formed in the bottom of the case 102. The threaded inserts 122, 124 are maintained in the insert holes 328 by way of a press-fit engagement, bonding, welding, an adhesive, molding, or the like.

Figure 32:
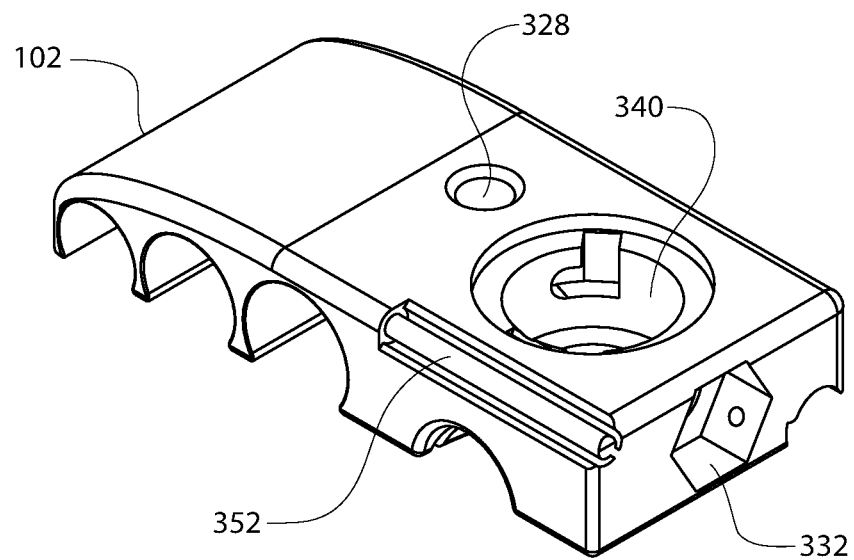
Figure 33:
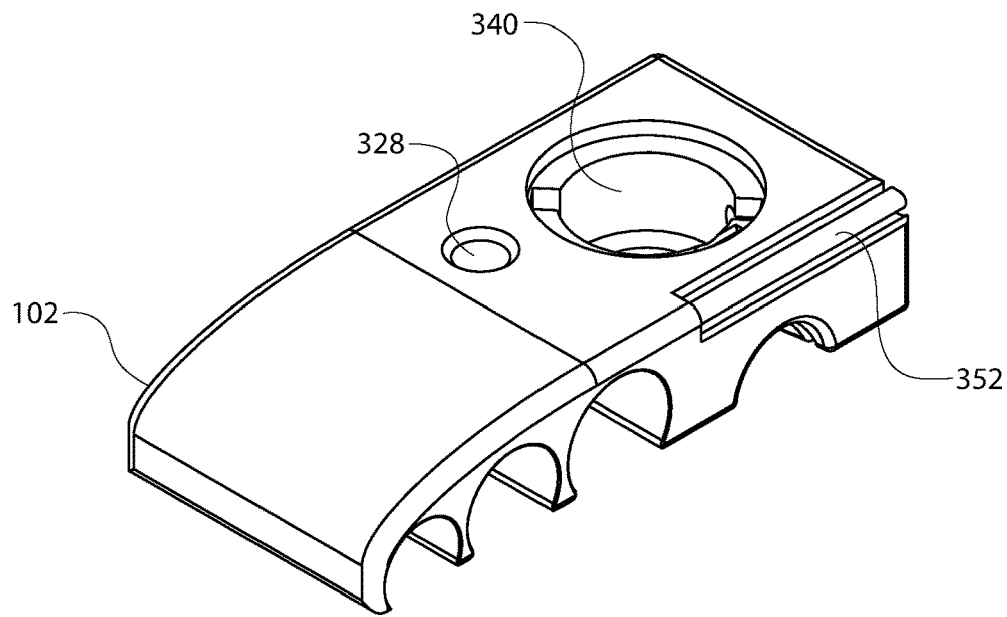

FIG. 31 and FIG. 32 both depict a die cavity 332, which is shaped, sized, and configured to accommodate and hold the die 116 (as described above). For this embodiment, the die cavity 332 is formed in the left side of the case 102. In other embodiments, the die cavity 332 can be located elsewhere on the case 102. The die cavity 332 can be shaped to match the outer perimeter shape of the die 116, e.g., hexagonal. As mentioned above with reference to FIG. 18, the set screw 150 can be used to hold the die 116 within the die cavity 332. In alternative embodiments, the die 116 can be installed in the case 102 by way of a press-fit engagement, bonding, welding, an adhesive, molding, or the like. In certain embodiments, the die cavity 332 includes a counterbore 334 formed in the case 102 (see FIG. 36). The counterbore 334 is desirable to provide additional clearance behind the die 116 to accommodate skateboard truck axles during thread repair using the die 116.

With particular reference to FIGS. 30-33 and 35, and with continued reference to FIG. 17, the case 102 includes a suitably configured ratchet cavity 340 for the drive ratchet 120. For this embodiment, the ratchet cavity 340 is formed in the bottom side of the case 102, however, the ratchet cavity 340 includes a portion that extends all the way through the case 102. In other embodiments, the ratchet cavity 340 can be located elsewhere on the case 102. The ratchet cavity 340 can include any number of features, structures, or elements as needed for compatibility with the specific design and specifications of the drive ratchet 120. In this regard, the drive ratchet 120 can be an off-the-shelf component, and the ratchet cavity 340 can be suitably designed and configured as needed to match the chosen drive ratchet 120 part.

Referring again to FIG. 17, the exemplary drive ratchet 120 includes two extending nubs that are received in two corresponding keyway features of the ratchet cavity 340. After installing the drive ratchet 120 into the ratchet cavity 340, the ratchet cap 126 is installed overlying the drive ratchet 120. The ratchet cap 126 is installed using an interference fit, and it locks the drive ratchet 120 in place by preventing rotation of the nubs within the keyway features.

Figure 37:
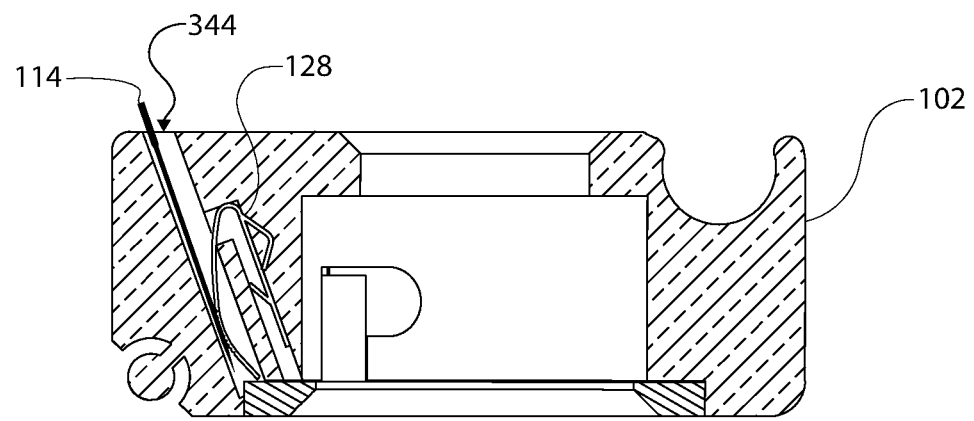
FIG. 37 is a cross sectional view taken along line B-B shown in FIG. 34, showing a razor blade in place.
Figure 38:
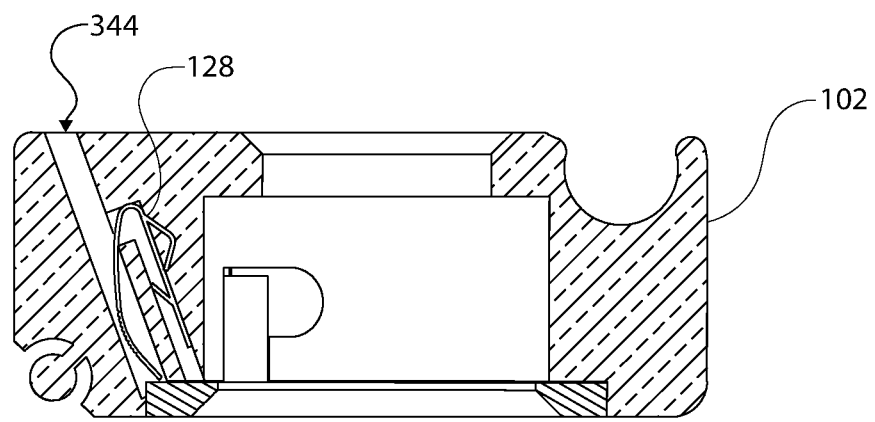
FIG. 38 is a cross sectional view taken along line B-B shown in FIG. 34, in the absence of a razor blade.

The razor blade retaining feature of the tool 100 will now be described with particular reference to FIG. 34 (a top view of the case 102), FIG. 37 (a cross sectional view taken along line B-B of FIG. 34, showing the razor blade 114 in place), and FIG. 38 (a cross sectional view taken along line B-B, in the absence of the razor blade 114). The case 102 includes a razor blade slot 344 integrally formed therein, and shaped, sized, and configured to receive a standard single-edged razor blade. For this embodiment, the razor blade slot is formed in the top of the case 102, and it is located near the front and left sides of the case 102. In other embodiments, the razor blade slot 344 can be located elsewhere on the case 102. As shown in FIG. 37 and FIG. 38, the razor blade slot 344 is slightly angled from the front to the back of the case. The spring clip 128 is exposed within the razor blade slot 344 such that it can engage with the side of the razor blade 114 and impart a sideways force to hold the razor blade 114 in place. In this way, the spring clip 128 cooperates with the razor blade slot 344 to safely secure the razor blade 114 to the case 102 in a removable manner.

Referring to FIGS. 28 and 29, the case 102 also includes a finger groove 348 that intersects the razor blade slot 344. The finger groove 348 is shaped, sized, and positioned (relative to the razor blade slot 344) to leave the top non-sharp portion of the razor blade 114 exposed when it is inserted in the razor blade slot 344, as shown in FIGS. 1-4. This makes it easier to grab the top of the razor blade 114 when removing and inserting it.

The spring clip 128 imparts sideways force against the razor blade 114 when the blade 114 is properly installed in the razor blade slot 344, as depicted in FIG. 37. The spring clip 128 is designed with sufficient tension to retain the razor blade 114 safely within the slot 344 when not in use. It should be appreciated that other retaining elements, schemes, or mechanisms can be utilized instead of the spring clip 128 if so desired. For example, a secure latch, a pin, a cover, or other features could be implemented.

Referring to FIGS. 15, 16, 32, 33, 35, 36, and 40, the case 102 also includes a retaining key 352 for the file 118. For this embodiment, the retaining key 352 is formed in the front-bottom corner edge of the case 102, at the left side of the case 102. In other embodiments, the retaining key 352 can be located elsewhere on the case 102. Attaching the file 118 at or near an edge of the case 102 is desirable for ergonomic and effective use of the file 118.

The retaining key 352 is shaped and sized to fit the file 118, which in this embodiment is implemented as a slotted roll pin, which may (but need not) have an abrasive outer surface. Accordingly, the retaining key 352 has a generally cylindrical head that is offset from the corner edge of the case 102. The file 118 can be installed onto the retaining key 352 from the exposed side of the key 352, as demonstrated in FIG. 15. The outer diameter of the cylindrically shaped portion of the retaining key 352 matches the inner diameter of the file 118 such that the file 118 is retained on the case 102 by way of an interference friction fit. In certain embodiments, an adhesive or a hot melt process could be used to further strengthen the coupling of the file 118 to the retaining key 352. Regardless of how the file 118 is attached or secured to the case, at least a portion of its working surface remains exposed, as shown in the figures.

In alternative embodiments, the file 118 can be realized as a simple dowel pin (e.g., a solid metal shaft) rather than a slotted roll pin. In such embodiments, the file 118 can be secured into a suitably shaped and sized slot or cavity formed in the case 102 by a press-fit engagement, an adhesive, or the like, such that a portion of the outer surface of the file 118 remains exposed. In other embodiments, the file 118 can be realized as a threaded pin that is screwed into the case 102, which is cooperatively configured such that some of the outer surface of the file 118 remains exposed, as described above.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A multi-function tool comprising:
   a case having a top side, a bottom side, a front side, a back side, a right side, and a left side;
   a drive ratchet installed in a ratchet cavity formed in the case, the drive ratchet comprising a fitting exposed at the top side of the case and further comprising a toggle switch exposed at the bottom side of the case, wherein manipulation of the toggle switch changes direction of the drive ratchet, and wherein the fitting is configured to receive sockets and a bar extension for the sockets;
   a threading die held within a die cavity formed in the case, the threading die comprising cutting threads to form or repair external threads;
   a file attached to the case such that at least a portion of a working surface of the file is exposed;
   a wrench retaining feature integrally formed in the case, the wrench retaining feature configured to secure a wrench to the case in a removable manner;
   a plurality of socket retaining features integrally formed in the case, each of the socket retaining features configured to secure a respective socket to the case in a removable manner; and
   a bar extension retaining feature integrally formed in the case, the bar extension retaining feature configured to secure a bar extension to the case in a removable manner.

2. The multi-function tool of claim 1, wherein the file is attached at or near an edge of the case.

3. The multi-function tool of claim 1, further comprising:
   a wrench tool removably coupled to the case via the wrench retaining feature;
   a plurality of different sized socket tools removably coupled to the case via the plurality of socket retaining features; and
   a bar extension tool removably coupled to the case via the bar extension retaining feature, wherein the drive ratchet and the fitting are compatible with the socket tools and the bar extension tool.

4. The multi-function tool of claim 1, further comprising a razor blade slot integrally formed in the case, the razor blade slot configured to receive a razor blade.

5. The multi-function tool of claim 4, further comprising a spring clip attached to the case, wherein the spring clip cooperates with the razor blade slot to secure the razor blade to the case in a removable manner.

6. The multi-function tool of claim 1, further comprising a mount arm removably attached to the case, the mount arm configured to hold a mobile device in place on the case in an orientation intended to support a camera function of the mobile device.

7. The multi-function tool of claim 6, wherein:
   the mount arm comprises a slot formed therein to accommodate adjustment of the mount arm relative to the case;
   the multi-function tool further comprises a thumb screw and a threaded insert located on the case, the threaded insert configured to receive the thumb screw; and
   the slot receives the thumb screw to facilitate adjustment of a clamping position of the mount arm, such that tightening of the thumb screw secures the mobile device to the case.

8. The multi-function tool of claim 1, further comprising:
   a tripod having a threaded tip; and
   a threaded insert located on the case, the threaded insert configured to receive the threaded tip of the tripod.

9. The multi-function tool of claim 1, wherein the drive ratchet is installed in a longitudinally offset location of the case such that the case serves as a moment arm when the drive ratchet is used.

10. The multi-function tool of claim 1, further comprising a finger slot formed in the case at an end of the bar extension retaining feature, the finger slot forming a gap underlying an end of a bar extension tool seated in the bar extension retaining feature.

11. The multi-function tool of claim 1, further comprising a finger slot formed in the case at an end of the wrench retaining feature, the finger slot forming a gap underlying an end of a wrench tool seated in the wrench retaining feature.

12. The multi-function tool of claim 1, wherein the drive ratchet and fitting are oriented to hold a bar extension tool substantially perpendicular to the case.

13. A multi-function tool comprising:
   a case having a top side, a bottom side, a front side, a back side, a right side, and a left side;
   a drive ratchet installed in a ratchet cavity formed in the case, the drive ratchet comprising a fitting exposed at the top side of the case and further comprising a toggle switch exposed at the bottom side of the case, wherein manipulation of the toggle switch changes direction of the drive ratchet;
   a threading die held within a die cavity formed in the case, the threading die comprising cutting threads to form or repair external threads;
   a file attached to the case such that at least a portion of a working surface of the file is exposed;
   a wrench retaining feature integrally formed in the case;
   a wrench tool configured to be removably held by the wrench retaining feature;
   a plurality of socket retaining features integrally formed in the case;
   a plurality of socket tools configured to be removably held by the plurality of socket retaining features;
   a bar extension retaining feature integrally formed in the case; and
   a bar extension tool configured to be removably held by the bar extension retaining feature, wherein the drive ratchet and the fitting are compatible with the socket tools and the bar extension tool.

14. The multi-function tool of claim 13, further comprising a razor blade slot integrally formed in the case, the razor blade slot configured to receive a razor blade.

15. The multi-function tool of claim 14, further comprising a spring clip attached to the case, wherein the spring clip cooperates with the razor blade slot to secure the razor blade to the case in a removable manner.

16. The multi-function tool of claim 13, further comprising a mount arm removably attached to the case, the mount arm configured to hold a mobile device in place on the case in an orientation intended to support a camera function of the mobile device.

17. The multi-function tool of claim 13, further comprising:
    a tripod having a threaded tip; and
    a threaded insert located on the bottom side of the case, the threaded insert configured to receive the threaded tip of the tripod.

18. The multi-function tool of claim 13, further comprising a finger slot formed in the case at an end of the bar extension retaining feature, the finger slot forming a gap underlying an end of the bar extension tool when seated in the bar extension retaining feature, and underlying an end of the wrench tool when seated in the wrench retaining feature.

19. The multi-function tool of claim 13, wherein the drive ratchet and fitting are oriented to hold the bar extension tool substantially perpendicular to the case.

20. A multi-function tool comprising:
    a case having a top side, a bottom side, a front side, a back side, a right side, and a left side;
    a drive ratchet installed in a ratchet cavity formed in the case, the drive ratchet comprising a fitting exposed at the top side of the case and further comprising a toggle switch exposed at the bottom side of the case, wherein manipulation of the toggle switch changes direction of the drive ratchet;
    a threading die held within a die cavity formed in the case, the threading die comprising cutting threads to form or repair external threads;
    a file attached to the case such that at least a portion of a working surface of the file is exposed;
    a wrench tool removably secured to the case by a wrench retaining feature integrally formed in the case;
    a plurality of socket tools removably secured to the case by a plurality of socket retaining features integrally formed in the case; and
    a bar extension tool removably secured to the case by a bar extension retaining feature integrally formed in the case, wherein the bar extension tool is compatible with the socket tools, the fitting of the drive ratchet is compatible with the socket tools, and the fitting of the drive ratchet is compatible with the bar extension tool.

* * * * *